United States Patent
Nishikawa et al.

(10) Patent No.: US 12,472,842 B2
(45) Date of Patent: Nov. 18, 2025

(54) INFORMATION PROCESSING METHOD, INFORMATION PROCESSING DEVICE, AND INFORMATION PROCESSING PROGRAM

(71) Applicant: PANASONIC INTELLECTUAL PROPERTY MANAGEMENT CO., LTD., Osaka (JP)

(72) Inventors: Shinya Nishikawa, Osaka (JP); Takashi Iida, Hyogo (JP); Changhui Yang, Osaka (JP); Masaharu Amaike, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 367 days.

(21) Appl. No.: 17/762,286

(22) PCT Filed: Jul. 27, 2020

(86) PCT No.: PCT/JP2020/028703
§ 371 (c)(1),
(2) Date: Mar. 21, 2022

(87) PCT Pub. No.: WO2021/079582
PCT Pub. Date: Apr. 29, 2021

(65) Prior Publication Data
US 2022/0355702 A1    Nov. 10, 2022

(30) Foreign Application Priority Data
Oct. 24, 2019   (JP) .................................. 2019-193512

(51) Int. Cl.
*B60L 58/16*     (2019.01)
*B60L 53/80*     (2019.01)
(Continued)

(52) U.S. Cl.
CPC ............... *B60L 58/16* (2019.02); *B60L 53/80* (2019.02); *B60L 58/12* (2019.02); *B60L 58/18* (2019.02)

(58) Field of Classification Search
CPC .......... B60L 58/16; B60L 53/80; B60L 58/12; B60L 58/18; B60L 58/21; B60L 2240/26;
(Continued)

(56) References Cited

U.S. PATENT DOCUMENTS 10,406,926 B2   9/2019   Takatsuka et al.
10,414,280 B2   9/2019   Williams et al.
(Continued)

FOREIGN PATENT DOCUMENTS

CN   103400211 B   *   8/2015
EP      4002547 A1       5/2022
(Continued)

OTHER PUBLICATIONS

Shiau et al., "Impact of Battery Weight and Charging Patterns on the Economic and Environmental benefits of Plug-in Hybrid Vehicles", Annual Meeting of the Transportation Research Board, 2009. (Year: 2009).*

(Continued)

*Primary Examiner* — Paresh Patel
*Assistant Examiner* — Dilara Sultana
(74) *Attorney, Agent, or Firm* — Rimon P.C.

(57) ABSTRACT

An information processing method includes: acquiring a weight of an electric mobile body; acquiring an amount of power consumption of the mobile body for each of numbers of one or more batteries mounted on the mobile body, the amount of power consumption being calculated based on the number of batteries; calculating a degradation cost of batteries for each of the numbers of the one or more batteries, the degradation cost being calculated based on the amount of (Continued)

power consumption and on the number of batteries; calculating a charging cost for each of the numbers of the one or more batteries, the charging cost being calculated based on the weight; and determining a number of batteries to be actually mounted on the mobile body, in accordance with the degradation cost and the charging cost, and outputting the number of batteries to be mounted.

12 Claims, 13 Drawing Sheets

(51) Int. Cl.
    *B60L 58/12*    (2019.01)
    *B60L 58/18*    (2019.01)
(58) Field of Classification Search
    CPC .. B60L 2240/60; B60L 2260/54; B60L 58/22; H02J 7/0013; H02J 7/0048; Y02E 60/10; G06Q 10/06313
    See application file for complete search history.

(56) References Cited

U.S. PATENT DOCUMENTS

| | | | | |
|---|---|---|---|---|
| 2010/0262566 | A1* | 10/2010 | Yamamoto | B60L 53/665 705/412 |
| 2016/0047862 | A1* | 2/2016 | Shimizu | G06Q 20/145 702/63 |
| 2019/0126769 | A1* | 5/2019 | Schmalzried | G08G 5/0069 |
| 2019/0143826 | A1* | 5/2019 | Williams | B60L 53/30 700/305 |

FOREIGN PATENT DOCUMENTS

| | | | |
|---|---|---|---|
| JP | 5205962 B2 * | 6/2013 | |
| TW | 201445159 A * | 12/2014 | |
| WO | 2013/080211 A1 | 6/2013 | |
| WO | WO-2014002205 A1 * | 1/2014 | ......... B60L 11/1838 |

OTHER PUBLICATIONS

Omar et al, Lithium iron phosphate based battery—Assessment of the aging parameters and development of cycle life model Applied Energy 113 (2014) 1575-1585 (Year: 2014).*
Gormez, et al. "Cost Optimization of an Opportunity Charging Bus Network," 2018 IEEE Energy Conversion Congress and Exposition (ECCE), Portland, OR, USA, 2018, pp. 2782-2789 (Year: 2018).*
Li, S. Su, L. He and W. Gao, "An analysis on plug-in electric vehicle's operating cost considering cost of battery capacity degradation," 2017 IEEE International Conference on Industrial Technology (ICIT), Toronto, ON, Canada, 2017, pp. 1388-1392 (Year: 2017).*
Ostadi et al, "Optimal Sizing of the Battery Unit in a Plug-in Electric Vehicle", IEEE Transactions on vehicular Technology, vol. 63, No. 7, Sep. 2014, (Year: 2014).*
Hao et al. "An Analysis on Plug-in Electric Vehicle's Operating Cost Considering Cost of Battery Capacity degradation," 2017 IEEE International Conference on Industrial Technology (ICIT), Toronto, ON, Canada, 2017, pp. 1388-1392 (Year: 2017).*
Rere et al, "Metaheuristic Algorithms for Convolution Neural Network" Hindawi Publishing Corporation Computational Intelligence and Neuroscience, vol. 2016, Article ID 1537325, 13 pages) (Year: 2016).*
A. Pelletier et al. "Battery degradation and behavior for electric vehicles: Review and numerical analyses of several models", Transportation Research Part B 103 (2017) 158-187 (Year: 2017).*
B. Shaltout et al, "A Consumer-Oriented Control Framework for Performance Analysis in Hybrid Electric Vehicles", IEEE Transactions on Control Systems Technology, vol. 23, No. 4, Jul. 2015. (Year: 2015).*
B. Xu et al. "Energy Management Optimization in Consideration of Battery Deterioration for Commuter Plug-in Hybrid Electric Vehicle", Proceedings of the SICE Annual Conference 2016, Tsukuba, Japan, Sep. 20-23, 2016. (Year: 2016).*
International Search Report issued on Sep. 8, 2020 in International Patent Application No. PCT/JP2020/028703, with English translation.
Extended European Search Report dated Sep. 19, 2022 issued in the corresponding European Patent Application No. 20878356.3.

* cited by examiner

| MOBILE BODY ID | WEIGHT (kg) | FRONT PROJECTION AREA | MAXIMUM NUMBER-OF-BATTERIES-TO-BE-MOUNTED |
|---|---|---|---|
| EV_1 | XXXX | OOO | 10 |

| MOBILE BODY ID | TIMESTAMP | NUMBER-OF-BATTERIES-TO-BE-MOUNTED | LOAD-CARRYING AMOUNT (kg) | MOVING DISTANCE (km) | AMOUNT OF POWER CONSUMPTION (kWh) |
|---|---|---|---|---|---|
| EV_1 | ○○○~○○○ | 3 | LLL | XXX | YYY |
| ... | ... | ... | ... | ... | ... |

| MOBILE BODY ID | NUMBER OF BATTERIES | LOAD-CARRYING AMOUNT RANGE | MOVING DISTANCE RANGE | AMOUNT OF POWER CONSUMPTION (kWh) |
|---|---|---|---|---|
| EV_1 | 1 | 0~L1 | A1~A2 | W1 |
| EV_1 | 1 | L1~L2 | A2~A3 | W2 |
| ... | ... | ... | ... | ... |
| EV_1 | 2 | L2~L3 | A1~A2 | W3 |
| EV_1 | 2 | ... | A2~A3 | W4 |
| ... | ... | ... | ... | ... |

| VEHICLE ID | LOADING AMOUNT | DELIVERY ROUTE (MOVING DISTANCE) | NUMBER-OF-BATTERIES-TO-BE-MOUNTED |
|---|---|---|---|
| EV-1 | 300kg | ROUTE A(100km) | 3 |
| EV-2 | 200kg | ROUTE B(80km) | 2 |
| ... | ... | ... | ... |
| EV-n | 400kg | ROUTE X(100km) | 4 |

INFORMATION PROCESSING METHOD, INFORMATION PROCESSING DEVICE, AND INFORMATION PROCESSING PROGRAM

CROSS-REFERENCE OF RELATED APPLICATIONS

This application is the U.S. National Phase under 35 U.S.C. § 371 of International Patent Application No. PCT/JP2020/028703, filed on Jul. 27, 2020, which in turn claims the benefit of Japanese Patent Application No. 2019-193512, filed on Oct. 24, 2019, the entire disclosures of which Applications are incorporated by reference herein.

TECHNICAL FIELD

The present disclosure relates to a technique of outputting the number of batteries mounted on an electric mobile body.

BACKGROUND ART

In recent years, a vehicle carrying batteries of which the number can be increased or decreased has been proposed. For such a vehicle, it is required to determine an appropriate number of batteries in consideration of a distance from a point of departure to a destination, vehicle specifications, and the like. Increasing the number of batteries results in a longer traveling distance but also leads to a heavier weight that lowers traveling efficiency. Therefore, determining the appropriate number of batteries is not easy. Patent Literature 1 discloses a technique of calculating a battery expansion cost for each of a plurality of battery expansion patterns, based on vehicle specifications, calculating a fuel cost for each of the plurality of battery expansion patterns, based on generator specifications and route information, and determining the number of batteries, based on the battery expansion cost and the fuel cost.

However, according to the technique described in Patent Literature 1, when the number of batteries is determined, a degradation cost of the batteries is not taken into consideration. Therefore, reducing a total cost of the batteries, the total cost including the degradation cost, requires further improvement efforts.

CITATION LIST

Patent Literature

Patent Literature 1: Japanese Patent No. 5205962

SUMMARY OF INVENTION

An object of the present disclosure is to provide a technique by which the number of batteries can be determined so as to reduce a total cost of the batteries, the total cost including a degradation cost of the batteries.

An information processing method according to one aspect of the present disclosure is an information processing method executed by a computer, the method including: acquiring a weight of an electric mobile body, the weight including a weight of one or more batteries used in the mobile body; acquiring an amount of power consumption of the mobile body for each of numbers of the one or more batteries, the amount of power consumption being calculated based on a number of batteries; calculating a degradation cost of batteries for each of the numbers of the one or more batteries, the degradation cost being calculated based on the amount of power consumption and on the number of batteries; calculating a charging cost for each of the numbers of the one or more batteries, the charging cost being calculated based on the weight; and determining a number of batteries to be mounted representing a number of batteries to be actually mounted on the mobile body, in accordance with the degradation cost and the charging cost, and outputting the number of batteries to be mounted.

According to the present disclosure, the number of batteries can be determined so as to reduce a total cost of the batteries, the total cost including a degradation cost of the batteries.

BRIEF DESCRIPTION OF DRAWINGS

FIG. 7 illustrates an example of a data configuration of a traveling history information table.

FIG. 12 illustrates an example of a data configuration of a power amount information table.

FIG. 13 illustrates an example of a message screen according to the second embodiment.

DESCRIPTION OF EMBODIMENTS

Figure 1:
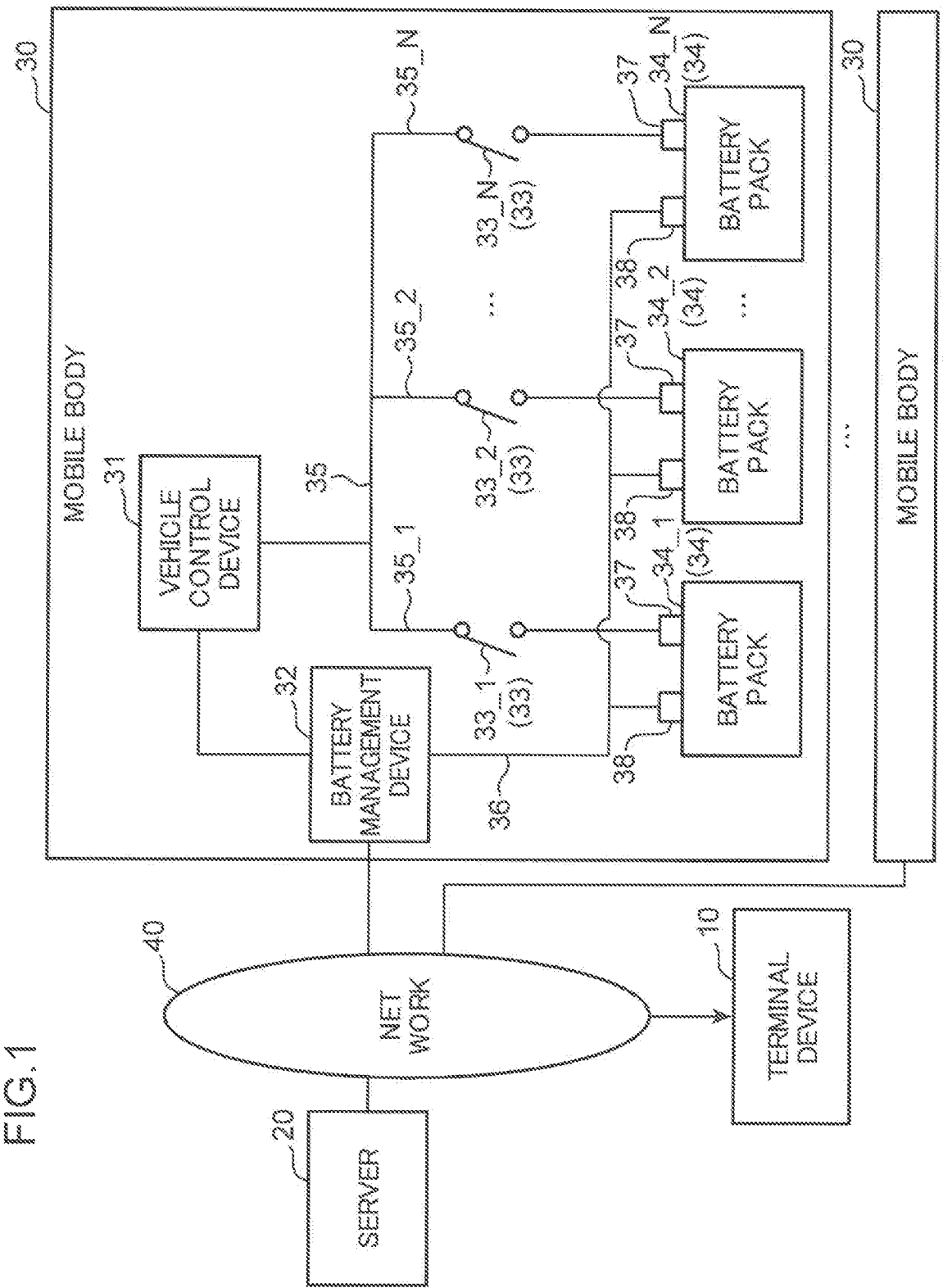
FIG. 1 illustrates an example of an overall configuration of an information processing system according to a first embodiment of the present disclosure.

Embodiments of the present invention will hereinafter be described with reference to the accompanying drawings. The following embodiments are examples of embodiment of the present invention, and are not intended to limit the technical scope of the present invention.

(Knowledge Underlying Present Disclosure)

The present inventor has studied a method of determining an optimum number of batteries for a mobile body carrying batteries the number of which can be increased or decreased. In such a mobile body, conventionally, a required amount of power consumption of the mobile body is calculated based on a traveling distance from a point of departure to a destination, and a minimum number of batteries, which is the number of batteries capable of providing power covering a required amount of power consumption, is determined as an optimum number of batteries. This approach is based on an idea that as the number of batteries decreases, the mobile body becomes lighter and consequently its power consumption amount decreases and the decreasing power consumption amount leads to a reduction in charging cost. In this manner, conventionally, only the charging cost is taken into consideration when the optimum number of batteries is calculated.

It is a known fact that a battery degrades faster as a depth of discharge (DOD), that is, a state-of-charge (SOC) range at the time of discharge gets wider. This happens because an increase in the DOD applies an excessive stress to binders binding active materials together in the battery, ultimately causing the binders to separate the active materials apart. When the number of batteries increases, load on the batteries is distributed among each battery, in which case the DOD of each battery reduces to suppress the degradation of each battery. This implies, therefore, that determining the optimum number of batteries by taking only the charging cost into consideration may accelerate the degradation of the battery. Faster degradation of the battery leads to a shorter cycle of battery replacement, thus resulting in an increase in battery cost from a long-term perspective.

Through the above study, the present inventor has reached a finding that the total cost of batteries is reduced by determining the optimum number of batteries in consideration of a charging cost depending on the number of batteries and a degradation cost depending on the number of batteries, and has conceived of the present disclosure.

An information processing method according to one aspect of the present disclosure is an information processing method executed by a computer, the method including: acquiring a weight of an electric mobile body, the weight including a weight of one or more batteries used in the mobile body; acquiring an amount of power consumption of the mobile body for each of numbers of the one or more batteries, the amount of power consumption being calculated based on a number of batteries; calculating a degradation cost of batteries for each of the numbers of the one or more batteries, the degradation cost being calculated based on the amount of power consumption and on the number of batteries; calculating a charging cost for each of the numbers of the one or more batteries, the charging cost being calculated based on the weight; and determining a number of batteries to be mounted representing a number of batteries to be actually mounted on the mobile body, in accordance with the degradation cost and the charging cost, and outputting the number of batteries to be mounted.

In this configuration, the degradation cost of batteries is calculated for each of the numbers of one or more batteries, based on the amount of power consumption and on the number of batteries, the charging cost of batteries is calculated for each of the numbers of one or more batteries, based on the weight of the mobile body, and the number of batteries to be mounted is determined, according to the degradation cost and the charging cost. In this manner, in this configuration, the number of batteries to be mounted is determined by taking into consideration the degradation cost in addition to the charging cost. Because of this, the number of batteries can be determined so as to reduce a total cost of the batteries, the total cost including the degradation cost of the batteries. In other words, the degradation of the batteries can be suppressed as power consumption by the batteries is suppressed.

According to the above information processing method, the method may further include acquiring a moving distance of the mobile body, in which in acquiring the amount of power consumption, the amount of power consumption may be acquired by calculating the amount of power consumption for each of numbers of the one or more batteries, from the moving distance and the weight.

In this configuration, because the amount of power consumption is calculated for each of the numbers of the one or more batteries, from the moving distance and the weight of the mobile body, the amount of power consumption can be calculated accurately.

According to the above information processing method, the method may further include acquiring a traveling history of the mobile body, in which in acquiring the amount of power consumption, the amount of power consumption corresponding to a moving distance of the mobile body may be acquired for each of numbers of the one or more batteries, from the traveling history.

In this configuration, because the amount of power consumption corresponding to the moving distance is acquired for each of the numbers of the one or more batteries, from the traveling history of the mobile body, an appropriate amount of power consumption can be acquired from the traveling history of the mobile body.

According to the above information processing method, in calculating the degradation cost, a remaining capacity of batteries may be acquired for each of numbers of the one or more batteries and the degradation cost may be calculated based on a total of the remaining capacities for each of the numbers of the one or more batteries and on the amount of power consumption.

In this configuration, because the degradation cost of batteries is calculated based on the total of the remaining capacities of batteries for each of the numbers of the one or more batteries in addition to the amount of power consumption and the number of batteries, the degradation cost can be calculated more accurately.

According to the above information processing method, in calculating the degradation cost, the degradation cost may be calculated for each of numbers of the one or more batteries, based on a current flowing through each of one or more batteries.

In this configuration, because the degradation cost is calculated based on the current flowing through each of one or more batteries, the degradation cost can be accurately calculated.

According to the above information processing method, in determining the number of batteries to be mounted, the number of batteries to be mounted may be determined according to a total of the degradation cost and the charging cost.

In this configuration, because the number of batteries to be mounted is determined according to the total of the degradation cost and the charging cost, the number of batteries to be mounted can be determined directly from a total cost of batteries. A process of determining the number of batteries to be mounted, therefore, can be made quicker or load can be reduced.

According to the above information processing method, in acquiring the moving distance, the moving distance may be acquired based on user input.

In this configuration, the moving distance can be acquired by causing the user to input the moving distance.

According to the above information processing method, in acquiring the moving distance, a moving distance that is calculated based on a vehicle allocation plan to allocate the mobile body may be acquired.

In this configuration, the moving distance can be acquired by calculating the moving distance based on the vehicle allocation plan.

The present disclosure may be embodied as an information processing program that causes a computer to execute characteristic constituent elements included in the information processing method or as an information processing device run by this information processing program. Needless to say, such a computer-executable program can be distributed by using a computer-readable, non-transitory recording medium, such as CD-ROM, or through a communication network, such as the Internet.

It should be noted that each of embodiments described below is a specific example of the present disclosure. Numerical values, shapes, constituent elements, steps, the order of steps, and the like, which are described in the following embodiments, are examples, and are not intended to limit the present disclosure. Among constituent elements included in the following embodiments, constituent elements not described in independent claims expressing the most superior concept of the present disclosure will be described as optional constituent elements. Respective contents of all embodiments may be combined with each other.

First Embodiment

FIG. 1 illustrates an example of an overall configuration of an information processing system 1 according to a first embodiment of the present disclosure. The information processing system 1 is a system that manages a mobile body 30 to or from which N battery packs 34 (N denoting an integer of 1 or larger) can be attached or detached. In the following description, it is assumed that the information processing system 1 is applied to a home delivery system that delivers loads to houses by the mobile body 30. This is, however, an example, and the information processing system 1 may be applied also to a system different from the home delivery system. For example, the information processing system 1 may be applied to a rental car system that manages rental cars or to a car sharing system that manages sharing cars.

The information processing system 1 includes a terminal device 10, a server 20, and one or more mobile bodies 30. The terminal device 10 and the server 20 are interconnected through a network 40 so as to be able to communicate with each other. The terminal device 10 and the mobile bodies 30 are interconnected through the network 40 so as to be able to communicate with each other. The network 40 is, for example, a wide area network, such as the Internet.

The terminal device 10 is placed in, for example, a delivery base of the home delivery system. The delivery base keeps loads to be delivered to an area covered by the delivery base. At the delivery base, workers engaged in load delivery are stationed. A worker puts a load onto the mobile body 30 or delivers the load by the mobile body 30. When the information processing system 1 is applied to a car rental system or a car sharing system, the delivery base is replaced by a car rental company's office or a car sharing company's office.

The terminal device 10 is, for example, a portable terminal, such as a tablet terminal and a smartphone, or a stationary-type computer. The terminal device 10 notifies the mobile body 30 of a number of batteries to be mounted on the mobile body 30. The worker at the delivery base mounts the battery packs 34 the number of which is the number-of-batteries-to-be-mounted notified by the terminal device 10, on the mobile body 30.

The server 20 includes, for example, one or more computers. The server 20 manages traveling history information indicating a traveling history of the mobile body 30, vehicle information of the mobile body 30, a remaining capacity of the battery packs 34, and the like.

The mobile body 30 is, for example, an electric mobile body, such as an electric car. The mobile body 30 carries one or more loads and delivers the loads to a delivery destination. The mobile body 30 includes a vehicle control device 31, a battery management device 32, switches 33_1 to 33_N, battery packs 34_1 to 34_N, a power line 35, and a signal line 36. Hereinafter, the switches 33_1 to 33_N are referred to as the switch 33 when distinguishing the switches 33_1 to 33_N from each other is not necessary. Likewise, the battery packs 34_1 to 34_N are referred to as the battery pack 34 when distinguishing the battery packs 34_1 to 34_N from each other is not necessary.

The vehicle control device 31 and the battery packs 34_1 to 34_N are electrically connected to each other through the power line 35. The power line 35 includes N branch lines 35_1 to 35_N corresponding respectively to the battery packs 34_1 to 34_N. The power line 35 connects the battery packs 34_1 to 34_N in parallel through the branch lines 35_1 to 35_N. The signal line 36 electrically connects the vehicle control device 31 to the battery management device 32, and electrically connects the battery management device 32 to the battery packs 34_1 to 34_N as well. The signal line 36 carries flows of voltage and current that are detected by a sensor included in the battery pack 34, as a current value and a voltage value.

The vehicle control device 31 is, for example, a computer including a processor, a memory, and the like, and performs overall control of the mobile body 30. The battery management device 32 manages the battery pack 34. The battery management device 32 detects a remaining capacity of the battery pack 34 and transmits the remaining capacity to the server 20 via the network 40. The battery management device 32 acquires traveling data on traveling of the mobile body 30, from the vehicle control device 31 and transmits the traveling data to the server 20 via the network 40.

The switches 33_1 to 33_N are provided respectively on the branch lines 35_1 to 35_N, and corresponds respectively to the battery packs 34_1 to 34_N. The switch 33 is, for example a relay or a semiconductor switch. The switch 33 connects or disconnects the branch lines 35_1 to 35_N according to a control signal from the battery management device 32 or a worker's operation.

The battery pack 34 includes a terminal 37 for detachably connecting the battery pack 34 to the power line 35, and a terminal 38 for detachably connecting the battery pack 34 to the signal line 36. The battery pack 34 is, for example, a rechargeable secondary battery, such as a lithium ion battery.

Figure 2:
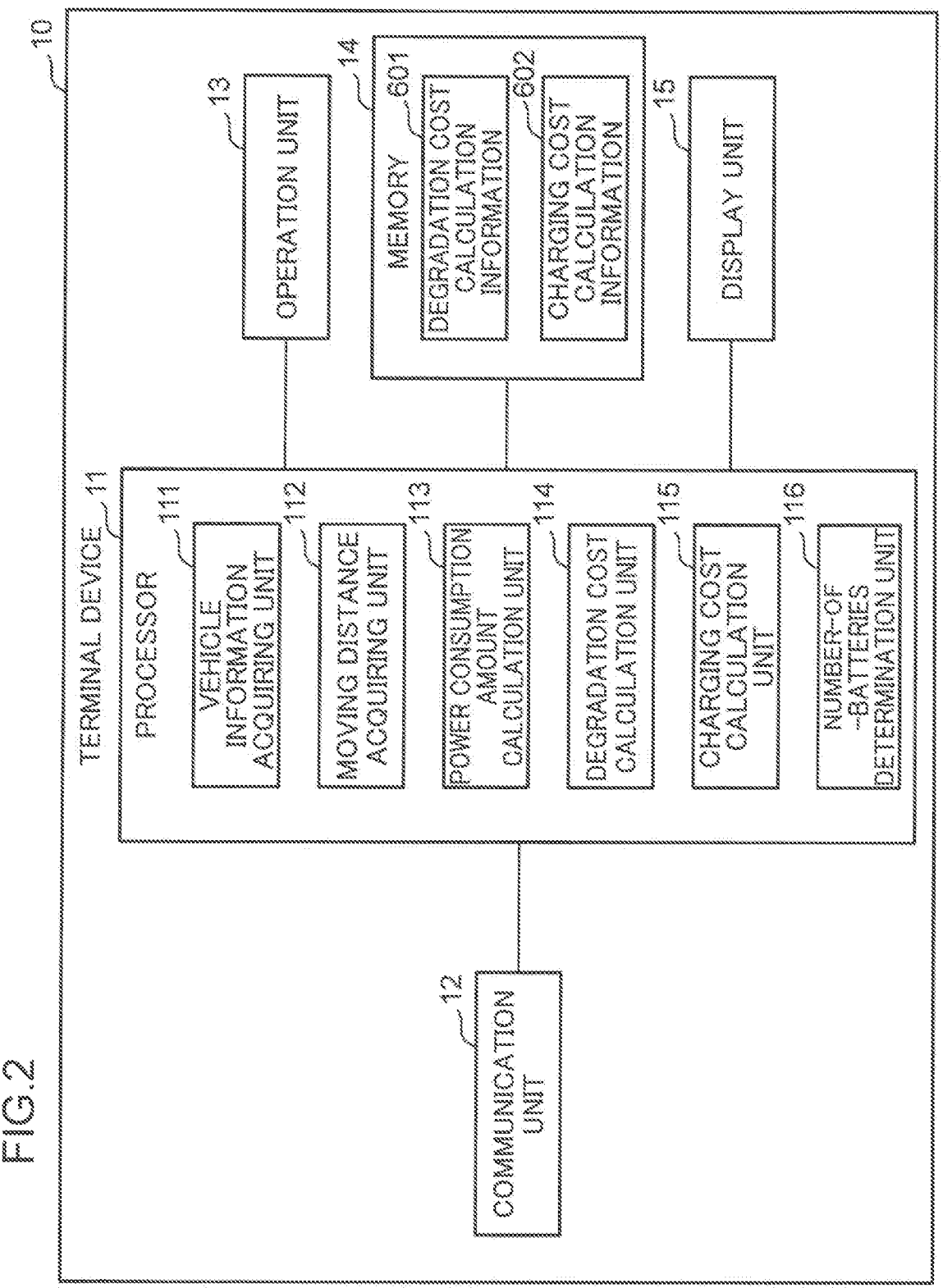
FIG. 2 is a block diagram showing a detailed configuration of a terminal device according to the first embodiment.

FIG. 2 is a block diagram showing a detailed configuration of the terminal device 10 according to the first embodiment. The terminal device 10 includes a processor 11, a communication unit 12, an operation unit 13, a memory 14, and a display unit 15.

The processor 11 is, for example, an electric circuit, such as a CPU. The processor 11 includes a vehicle information acquiring unit 111, a moving distance acquiring unit 112, a power consumption amount calculation unit 113, a degradation cost calculation unit 114, a charging cost calculation unit 115, and a number-of-batteries determination unit 116.

The vehicle information acquiring unit 111 (an example of a first acquiring unit) acquires vehicle information including specifications of the mobile body 30, such as its weight. The vehicle information acquiring unit 111 acquires the vehicle information, for example, by communicating with the server 20 via the communication unit 12. The moving distance acquiring unit 112 acquires a moving distance of the mobile body 30. This moving distance is, for example, the moving distance of the mobile body 30 on the traveling route.

The moving distance acquiring unit 112, for example, calculates a moving distance based on information input by the worker (user) to the operation unit 13, thereby acquiring the moving distance. Operating the operation unit 13, for example, the worker inputs information of a point of departure (e.g., a delivery base), a transit point as a delivery destination, a destination (e.g., a delivery base), and the like. The moving distance acquiring unit 112 inputs these pieces of input information to a predetermined route search system, thereby acquiring a traveling route and the moving distance of the traveling route. This route search system may be installed in the processor 11 or in an external server connected to the network 40.

For each number-of-batteries n representing the number of one or more battery packs 34 mounted on the mobile body 30, the power consumption amount calculation unit 113 (an example of a second acquiring unit) acquires an amount of power consumption of the mobile body 30, the amount of power consumption being calculated based on the number-of-batteries n. The number-of-batteries n is a parameter that is used, for convenience's sake, to calculate an amount of power consumption for each of numbers of battery packs 34. n denotes an integer of 1 or lager.

The amount of power consumption of the mobile body 30 is determined by the driving force of the mobile body 30. This driving force is determined by F=ma (m: mass, a: acceleration), according to the second law of motion. As this formula indicates, the amount of power consumption of the mobile body 30 depends on the weight (mass) of the mobile body 30, that is, the greater the weight, the larger the amount of power consumption. The weight of the mobile body 30 increases as the number-of-batteries n increases. The power consumption amount calculation unit 113, therefore, adds a weight increment corresponding to the number-of-batteries n, to the weight of the mobile body 30 indicated in vehicle information acquired by the vehicle information acquiring unit 111, thereby calculating a total weight of the mobile body 30. The power consumption amount calculation unit 113 then gives the total weight to the above arithmetic expression for determining the driving force, thus determining the driving force of the mobile body 30. The power consumption amount calculation unit 113 then inputs the determined driving force to power amount calculation information preset for determining the amount of power consumption, thereby calculating the amount of power consumption. The power amount calculation information is, for example, a preset function or table indicating a correspondence relationship between the driving force and the amount of power consumption.

Actually, the arithmetic expression (F=ma) for determining the driving force of the mobile body 30 includes a component different from ma, the component depending on air resistance and the like. This component, however, does not depend on mass and therefore can be regarded as an offset element in the arithmetic expression for determining the driving force. The arithmetic expression for determining the driving force, therefore, may include a component different from ma, the component depending on air resistance and the like, as an offset element. The power amount calculation information may be a function or table from which the amount of power consumption is determined by inputting the number-of-batteries n to the function or table.

The amount of power consumption increases as the moving distance of the mobile body 30 increases. The power consumption amount calculation unit 113, therefore, may increase the amount of power consumption determined from the power amount calculation information in correspondence to the moving distance acquired by the moving distance acquiring unit 112, thereby calculating a final amount of power consumption of the mobile body 30.

Furthermore, the power amount calculation information may be a function or table that sets in advance a correspondence relationship between the total weight and the moving distance of the mobile body 30 and the amount of power consumption. In this case, the power consumption amount calculation unit 113 may calculate the amount of power consumption by inputting the total weight and the moving distance to the power amount calculation information.

The power consumption amount calculation unit 113 may calculate the total weight in consideration of a load-carrying amount and the weight of an occupant in the mobile body 30 and calculate the amount of power consumption, using the calculated total weight.

The degradation cost calculation unit 114 calculates a degradation cost of the battery pack 34 for each number-of-batteries n, based on the amount of power consumption and on the number-of-batteries n. Specifically, the degradation cost calculation unit 114 compares the amount of power consumption calculated by the power consumption amount calculation unit 113 with a total battery capacity of the battery pack 34 for each number-of-batteries n, thereby calculating a minimum number-of-batteries n_min that provides power covering the amount of power consumption.

The degradation cost calculation unit 114 calculates the degradation cost for each number-of-batteries n within a range from the minimum number-of-batteries n_min to a maximum number of batteries the mobile body 30 can carry (a maximum number-of-batteries-to-be-mounted n_max).

In this case, the degradation cost calculation unit 114 calculates the degradation cost using, for example, degradation cost calculation information 601 (see FIG. 3) that presets a correspondence relationship between numbers-of-batteries n and degradation costs corresponding respectively to the numbers-of-batteries n. The degradation cost is a value representing an estimated degree of degradation of the battery pack 34. The larger value of the degradation cost indicates the larger degree of degradation of the battery pack 34.

Figure 3:
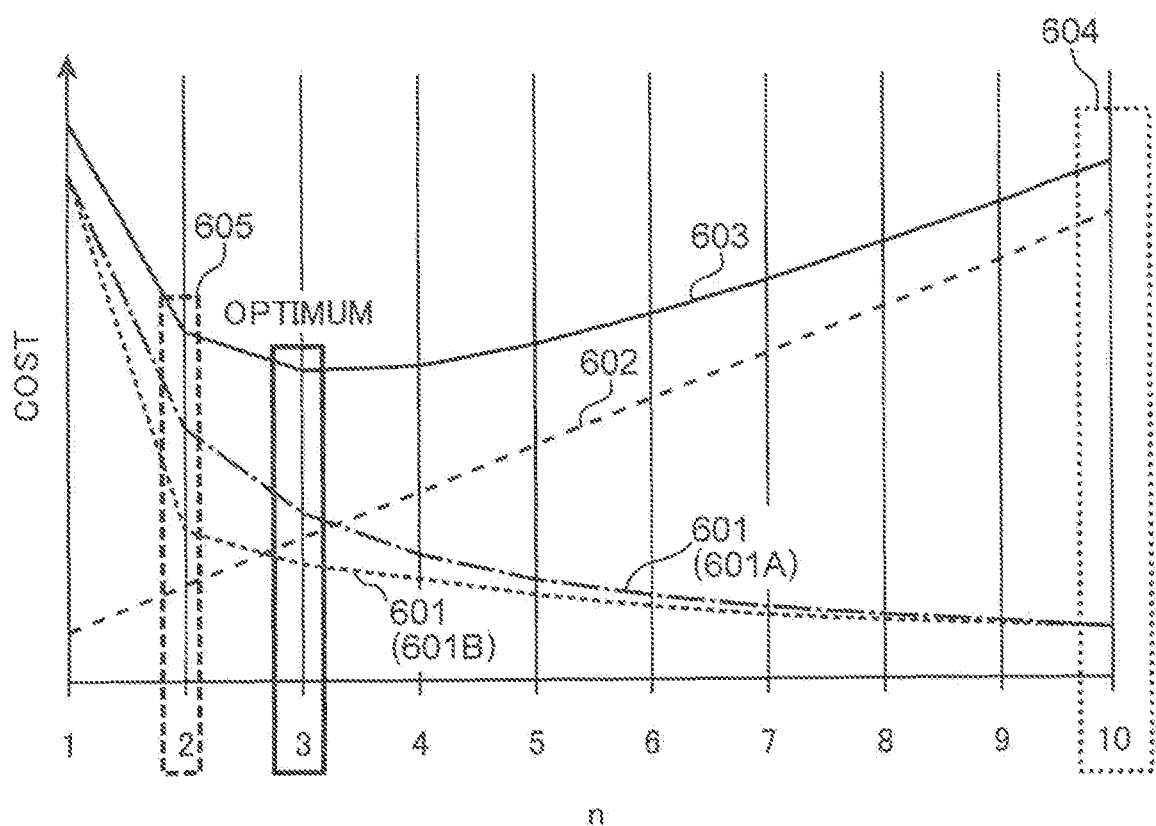
FIG. 3 illustrates an example of degradation cost calculation information and charging cost calculation information.

FIG. 3 illustrates an example of degradation cost calculation information 601 and charging cost calculation information 602. Degradation cost calculation information 601B in FIG. 3 will be described in a second embodiment, and degradation cost calculation information 601A will be described here. As shown in FIG. 3, the degradation cost calculation information 601A characteristically indicates that the degradation cost reaches its maximum when the number-of-batteries n is n=1, and that the degradation cost gradually decreases as the number-of-batteries n increases like n=1, 2, . . . . This is because that the increase of the number-of-batteries n results in distribution of load among the battery packs 34_1 to 34_N, thus reducing the depth of discharge (DOD) of each battery pack 34. The degradation cost calculation information 601A also shows that a degradation cost decrement becomes smaller as the number-of-batteries n increases, indicating that the degradation cost decreases non-linearly with the increase of the number-of-batteries n. The degradation cost calculation information 601A further indicates that a decrease in the degradation cost is hardly expected when the number-of-batteries n reaches a certain value or larger value.

The battery pack 34 contains binders binding active materials together. As the DOD increases, a stress applied to the binders increases, and when the strength of the stress reaches a certain level or higher, the binders separates the active materials apart. This accelerates degradation of the battery pack 34. In this manner, since the binders do not separate the active materials apart until a stress of a certain strength is applied to the binders, the number of binders having separated the active materials apart increases not linearly but nonlinearly, with respect to the DOD. For this reason, the degradation cost increases nonlinearly as the number-of-batteries n decreases. Referring to the degradation cost calculation information 601A, the degradation cost calculation unit 114 calculates the degradation cost for each number-of-batteries n.

The degradation cost calculation unit 114 may acquire a remaining capacity of the battery pack 34 for each number-of-batteries n and calculate the degradation cost, based on a total of remaining capacities of the battery pack 34 each acquired for each number-of-batteries n and on the amount of power consumption. For example, the degradation cost calculation unit 114 picks n battery packs 34 out of a battery list listing battery backs 34 that can be mounted on the mobile body 30, and makes an inquiry to the server 20 about remaining capacities of n battery packs 34 by specifying respective battery IDs (identifiers) of n battery packs 34.

Figure 8:
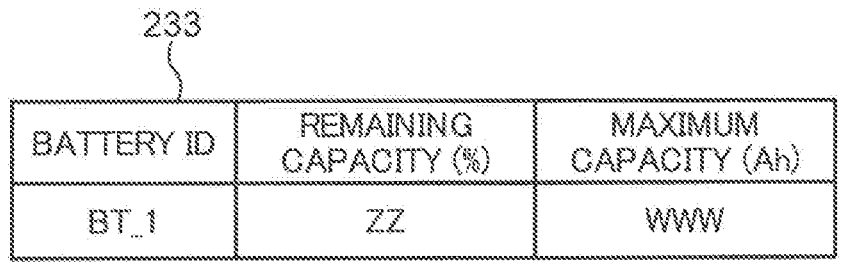
FIG. 8 illustrates an example of a data configuration of a battery management information table.

Referring to a battery management information table 233 shown in FIG. 8, the server 20 acquires respective remaining capacities of n battery packs 34 related to the inquiry, and transmits the remaining capacities to the terminal device 10. The charging cost calculation unit 115 thus acquires respective remaining capacities of n battery packs 34 (batteries of which the number is n). The charging cost calculation unit 115 sums up acquired respective remaining capacities of the batteries of which the number is n to calculate a total battery capacity of the batteries of which the number is n. The degradation cost calculation unit 114 then compares this total battery capacity with the amount of power consumption calculated by the power consumption amount calculation unit 113, thereby calculating the minimum number-of-batteries n_min.

The following case may also be possible. In some cases, starting to use the battery pack 34 with a remaining capacity lower than the full-charge capacity (e.g., SOC of 80%, 70%, 60%, etc.) is more effective for degradation suppression than starting to use the battery pack 34 with the full-charge capacity. A remaining capacity lower than the full-charge capacity will hereinafter be referred to as "start remaining capacity". For this reason, the used battery pack 34 may be mounted on the mobile body 30 after being charged by a charger to have the start remaining capacity. In this case, when calculating the total battery capacity of the battery packs 34 for each number-of-batteries n, the degradation cost calculation unit 114 calculates the total battery capacity by multiplying the start remaining capacity by the number-of-batteries n. The degradation cost calculation unit 114 then compares this total battery capacity with the amount of power consumption calculated by the power consumption amount calculation unit 113, thereby calculating the minimum number-of-batteries n_min. The start remaining capacity may have a 100% SOC.

The charging cost calculation unit 115 calculates a charging cost for each of numbers-of-batteries n of 1 or more, based on the weight of mobile body 30. The charging cost is an estimated value representing a cost required for charging the mobile body 30. The lower the power cost, the larger the value of the charging cost. The power cost is a power consumption rate of the mobile body 30, which is an electric car or the like, and is expressed as, for example, kilometers to travel per 1 kilowatt-hour (km/kWh). As the value of the charging cost increases, therefore, the power cost decreases.

In this embodiment, the charging cost calculation unit 115 calculates the charging cost using charging cost calculation information 602 (see FIG. 3) that presets a correspondence relationship between numbers-of-batteries n and charging costs corresponding respectively to the numbers-of-batteries n.

As shown in FIG. 3, the charging cost calculation information 602 characteristically indicates that the charging cost increases gradually as the number-of-batteries n increases like n=1, 2, . . . . In the example of FIG. 3, the charging cost calculation information 602 indicates the charging cost increasing linearly with respect to the number-of-batteries n. This is because the total weight of the mobile body 30 increases as the number-of-batteries n increases, and consequently the power cost decreases as the charging cost increases. The charging cost calculation information 602 is calculated in advance in consideration of the decrease of the power cost of the mobile body 30 that results from the increase of the total weight caused by the increasing number-of-batteries n. Therefore, the charging cost corresponding to the number-of-batteries n, the charging cost being acquired by the charging cost calculation unit 115 having referred to the charging cost calculation information 602, represents the charging cost that is calculated based on the weight of the mobile body 30.

The number-of-batteries determination unit 116 (an example of a determination unit and an output unit) determines a number-of-batteries-to-be-mounted representing a number of batteries to be actually mounted on the mobile body 30, according to the degradation cost calculated by degradation cost calculation unit 114 and the charging cost calculated by charging cost calculation unit 115.

The degradation cost indicated by the degradation cost calculation information 601 and the charging cost indicated by the charging cost calculation information 602, both costs being shown in FIG. 3, are normalized such that both costs have the same range. They are normalized, for example, such that the degradation cost takes values ranging from 0 to 100% as the charging cost also takes values ranging from 0 to 100%.

Thus, for each number-of-batteries n, the charging cost calculation unit 115 adds up a degradation cost calculated by the degradation cost calculation unit 114 for each number-of-batteries n and a charging cost calculated by the charging cost calculation unit 115 for each number-of-batteries n, thereby calculating a total cost for each number-of-batteries n. Then, the charging cost calculation unit 115 determines the minimum of total costs each calculated for each number-of-batteries n to be a cost for the number-of-batteries-to-be-mounted.

A case where the number-of-batteries-to-be-mounted is determined in consideration of the degradation cost only will be considered with reference to FIG. 3. In this case, it is assumed that the minimum number-of-batteries n_min that provides power covering the amount of power consumption is 2. The degradation cost calculation information 601A indicates that the degradation cost decreases as the number-of-batteries n increases. In the example of FIG. 3, because the maximum number-of-batteries-to-be-mounted n_max is 10, the number-of-batteries n that makes the degradation cost the minimum in a range between the number-of-batteries n=2 and the number-of-batteries n=10 is n=10 (604). Therefore, the number-of-batteries-to-be-mounted in the case of taking only the degradation cost into consideration is 10. Seeing this from the viewpoint of charging cost, however, leads to an understanding that because the charging cost is the maximum at the point of the number-ofbatteries n being n=10, n=10 is not necessarily an appropriate number-of-batteries-to-be-mounted.

Next, a case where the number-of-batteries-to-be-mounted is determined in consideration of the charging cost only will be considered. The charging cost calculation information 602 indicates that the charging cost increases as the number-of-batteries n increases. The number-of-batteries-to-be-mounted in this case, which is the number-of-batteries n that makes the charging cost the minimum among numbers-of-batteries n providing power that covers the amount of power consumption, is therefore n=2 (605). From the viewpoint of degradation cost, however, n=2 is not appropriate because the degradation cost is large at the point of the number-of-batteries n being n=2.

For these reasons, the number-of-batteries determination unit 116 determines the number-of-batteries n that minimizes a total cost, i.e, a total of the degradation cost and the charging cost to be the number-of-batteries-to-be-mounted. In FIG. 3, total cost information 603 representing a corresponding relationship between the total cost and the number-of-batteries n indicates that the total cost is at its minimum when the number-of-batteries n is n=3. In the example of FIG. 3, therefore, the number-of-batteries determination unit 116 determines the number-of-batteries-to-be-mounted to be 3.

In this example, because the degradation cost and the charging cost are normalized, the total of both costs is adopted as the total cost. The present disclosure, however, is not limited to this case. For example, when both costs are not normalized, the number-of-batteries determination unit 116 may calculate the total cost for each number-of-batteries n by multiplying the degradation cost and the charging cost by coefficients for normalizing the degradation cost and the charging cost, respectively, and then adding up both costs. Alternatively, when both costs are not normalized, the number-of-batteries determination unit 116 may calculate the total cost for each number-of-batteries n by using a function defining a correspondence relationship between the degradation cost and charging cost and the total cost.

The number-of-batteries determination unit 116 outputs the number-of-batteries-to-be-mounted determined by the above process. In this case, the number-of-batteries determination unit 116 creates a message indicating the determined number-of-batteries-to-be-mounted and causes the display unit 15 to display the message, that is, outputs the number-of-batteries-to-be-mounted. This is, however, an example. The number-of-batteries determination unit 116 may cause a speaker (not illustrated) to output a voice message for notifying the number-of-batteries-to-be-mounted, instead of or in addition to causing the display unit 15 to display a message indicating the determined number-of-batteries-to-be-mounted.

The communication unit 12 is, for example, a communication circuit that connects the terminal device 10 to the network 40. The communication unit 12 receives vehicle information transmitted from the server 20. The communication unit 12 may further receive battery management information, such as the SOC of the battery pack 34, from the server 20.

The operation unit 13 receives an instruction from the worker. For example, the operation unit 13 receives information indicating the load-carrying amount of the mobile body 30 and information necessary for calculating the moving distance of the mobile body 30 (e.g., position information on a delivery base, a delivery destination, and the like), the information being entered by the worker. When the terminal device 10 is a portable information terminal, such as a smartphone or a tablet terminal, the operation unit 13 is configured by, for example, a touch panel. When the terminal device 10 is a stationary-type computer, the operation unit 13 is configured by such input devices as a keyboard and a mouse.

The memory 14 is a nonvolatile memory, such as a hard disk drive or a solid state drive. The memory 14 stores the degradation cost calculation information 601 and charging cost calculation information 602.

The display unit 15 displays a message or the like indicating the number-of-batteries-to-be-mounted determined by the number-of-batteries determination unit 116. The display unit 15 is, for example, a display, such as a liquid crystal panel or an organic EL panel.

Figure 4:
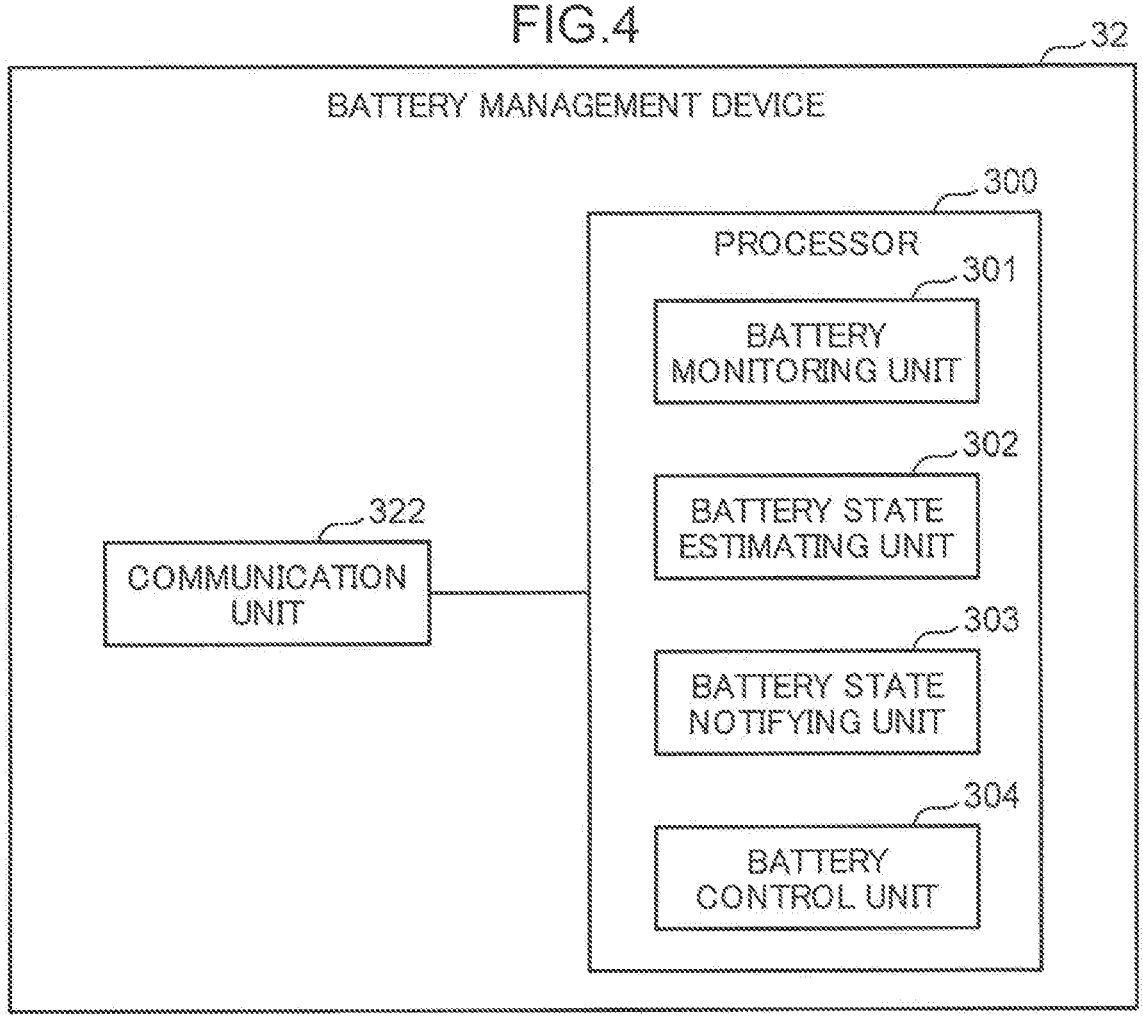
FIG. 4 is a block diagram showing a detailed configuration of a battery management device shown in FIG. 1.

FIG. 4 is a block diagram showing a detailed configuration of the battery management device 32 shown in FIG. 1. The battery management device 32 includes a processor 300 and a communication unit 322. The processor 300 is, for example, an electric circuit, such as a CPU. The processor 300 includes a battery monitoring unit 301, a battery state estimating unit 302, a battery state notifying unit 303, and a battery control unit 304.

The battery monitoring unit 301 monitors each battery pack 34 mounted on the mobile body 30. The battery monitoring unit 301, specifically, monitors a current, a voltage, and the like each battery pack 34 carries. The battery monitoring unit 301 monitors each battery pack 34 by acquiring sensing data at a predetermined sampling cycle, the sensing data being obtained by a current sensor and a voltage sensor included in the battery pack 34.

The battery state estimating unit 302 estimates the state of each battery pack 34 at a predetermined sampling cycle, based on a result of monitoring of each battery pack 34 by the battery monitoring unit 301. The estimated state of each battery pack 34 is, for example, a state of charge (SOC) of each battery pack 34. For example, the battery state estimating unit 302 calculates the SOC of each battery pack 34 by inputting a current and a voltage of each battery pack 34 that are acquired by the battery monitoring unit 301, to a predetermined arithmetic expression.

The battery state notifying unit 303 transmits information on the state of each battery pack 34 estimated by the battery state estimating unit 302, to the server 20 via the communication unit 322. In this case, the battery state notifying unit 303 transmits, at a predetermined sampling cycle, battery state information associating the SOC of each battery pack 34 with a battery ID, to the server 20 via the communication unit 322. This allows the server 20 to monitor the current remaining capacity of each battery pack 34.

The battery control unit 304 determines whether each battery pack 34 is in an abnormal state, based on the monitoring result of the battery monitoring unit 301, and when the battery pack 34 is in an abnormal state, turns off the switch 33 corresponding to the battery pack 34. When determining that a certain battery pack 34 is in an abnormal state, the battery control unit 304 may output information indicating the battery pack 34 being in the abnormal state, to the vehicle control device 31 and to the server 20. In this case, the vehicle control device 31 puts a message indicating the battery pack 34 being in the abnormal state, on a display attached to the driver's seat of the mobile body 30.

Furthermore, when the remaining capacity of the battery pack 34 becomes equal to or less than a predetermined value, the battery control unit 304 may output a control command to the vehicle control device 31 so as to drive the mobile body 30 in a power saving mode. The power saving mode is, for example, a mode in which power consumption by a motor of the mobile body 30 is made smaller than normal power consumption to slow down the reduction of the remaining capacity of the battery pack 34.

The communication unit 322 is, for example, a communication circuit that connects the battery management device 32 to the network 40. The communication unit 322 transmits state monitoring information on each battery pack 34 to the server 20 at a predetermined sampling cycle.

Figure 5:
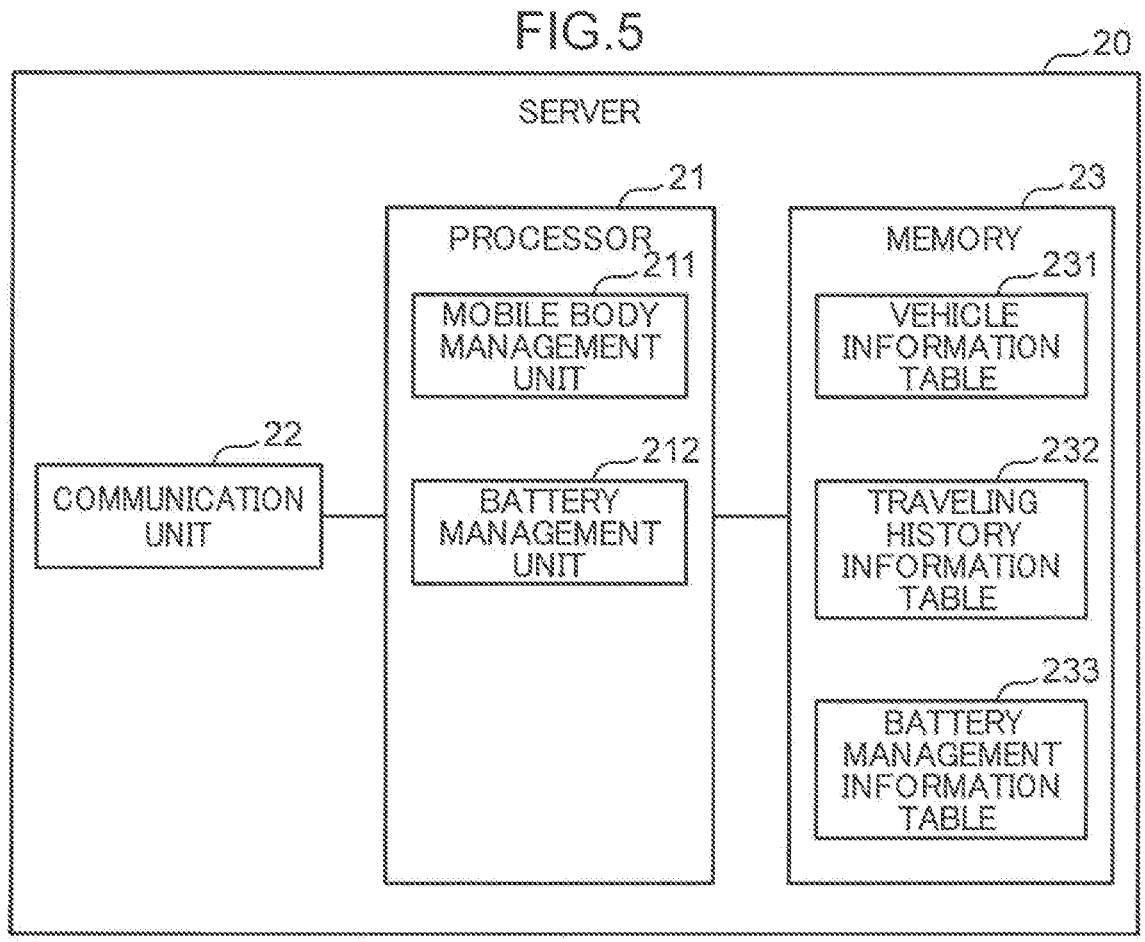
FIG. 5 is a block diagram showing a detailed configuration of a server shown in FIG. 1.

FIG. 5 is a block diagram showing a detailed configuration of the server 20 shown in FIG. 1. The server 20 includes a processor 21, a communication unit 22, and a memory 23. The processor 21 is an electric circuit, such as a CPU or a field-programmable gate array (FPGA). The processor 21 includes a mobile body management unit 211 and a battery management unit 212.

Figure 6:
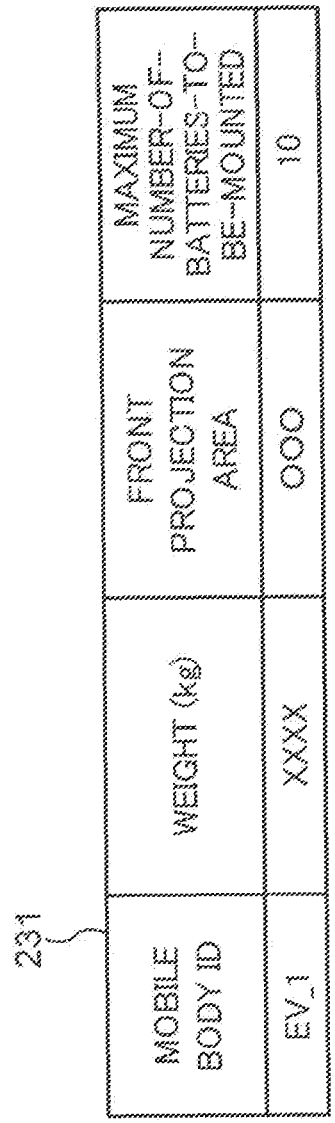
FIG. 6 illustrates an example of a data configuration of a vehicle information table.

The mobile body management unit 211 manages a vehicle information table 231 and a traveling history information table 232. FIG. 6 illustrates an example of a data configuration of the vehicle information table 231. The vehicle information table 231 is a database storing vehicle information on each mobile body 30. The vehicle information table 231 stores vehicle information associating a mobile body ID, a weight, a front projection area, and a maximum number-of-batteries-to-be-mounted, with each other. The mobile body ID is an identifier for the mobile body 30. The weight is the weight of the vehicle body of the mobile body 30. For example, when the mobile body 30 is a car, the weight represents the weight of the mobile body 30 not carrying a person nor a load. The front projection area is the area of a shadow that is formed at the time of a front projection of the mobile body 30. The front projection area serves as a yardstick for determining air resistance. The front projection area is an offset element in an arithmetic expression for determining the driving force of the mobile body 30. The maximum number-of-batteries-to-be-mounted is the maximum number-of-batteries n representing the maximum number of batteries the mobile body 30 can carry. In this table, "10" is entered as the maximum number-of-batteries-to-be-mounted of the mobile body 30 with a mobile body ID "EV_1".

The mobile body management unit 211, for example, acquires vehicle information from each mobile body 30, using the communication unit 22, and stores the vehicle information in the vehicle information table 231. Alternatively, the mobile body management unit 211 may store vehicle information that an administrator of the server 20 inputs by using an input device (not illustrated), in the vehicle information table 231. Vehicle information stored in the vehicle information table 231 may include a different type of information, providing that the vehicle information includes at least the weight and the maximum number-of-batteries-to-be-mounted.

FIG. 7 illustrates an example of a data configuration of the traveling history information table 232. The traveling history information table 232 is a table storing traveling history information indicating a traveling history of the mobile body 30. The traveling history information indicates traveling details of one round of traveling performed by the mobile body 30.

Specifically, the traveling history information table 232 stores traveling history information that associates a mobile body ID, a timestamp, a number-of-batteries-to-be-mounted, a load-carrying amount, a moving distance, and an amount of power consumption, with each other. In place of the load-carrying amount, a vehicle total weight may be stored in the table. The mobile body ID is the same as the mobile body ID shown in FIG. 7. The timestamp represents a timespan in which the mobile body 30 has actually traveled. In this table, the timestamp includes a traveling start time and a traveling end time. The number-of-batteries-to-be-mounted is the number of batteries the mobile body 30 carries during its traveling. The load-carrying amount is the weight of a load the mobile body 30 carries. The moving distance is the traveling distance of the mobile body 30. The amount of power consumption is the amount of power consumed by the mobile body 30.

After the mobile body 30 starts traveling, for example, the mobile body management unit 211 collects traveling data transmitted from the mobile body 30 at a predetermined sampling cycle in a period between the travel start time and the travel end time, calculates the moving distance and the amount of power consumption, and stores the calculated moving distance and amount of power consumption in the traveling history information table 232.

Now, FIG. 5 will be referred to again. The battery management unit 212 manages the battery management information table 233. FIG. 8 illustrates an example of a data configuration of the battery management information table 233. The battery management information table 233 stores battery management information including basic information on each battery pack 34 and the state of each battery pack 34. The battery management information table 233 stores the battery management information that associates a battery ID, a remaining capacity, and a maximum capacity, with each other. The battery ID is an identifier for each battery pack 34. The remaining capacity is the current capacity of each battery pack 34. In this table, an SOC is adopted as the remaining capacity. The maximum capacity is the maximum charging capacity within which each battery pack 34 can be charged.

The battery management unit 212 manages the battery management information by, for example, writing a remaining capacity to the battery management information table 233, the remaining capacity being included in battery state information on each battery pack 34 that is transmitted from the battery management device 32 at a predetermined sampling cycle. The battery management unit 212 may acquire the maximum capacity of each battery pack 34 through communication with the battery management device 32 and write the acquired maximum capacity to the battery management information table 233, or may write the maximum capacity the administrator of the server 20 inputs using the input device (not illustrated), to the battery management information table 233.

Figure 9:
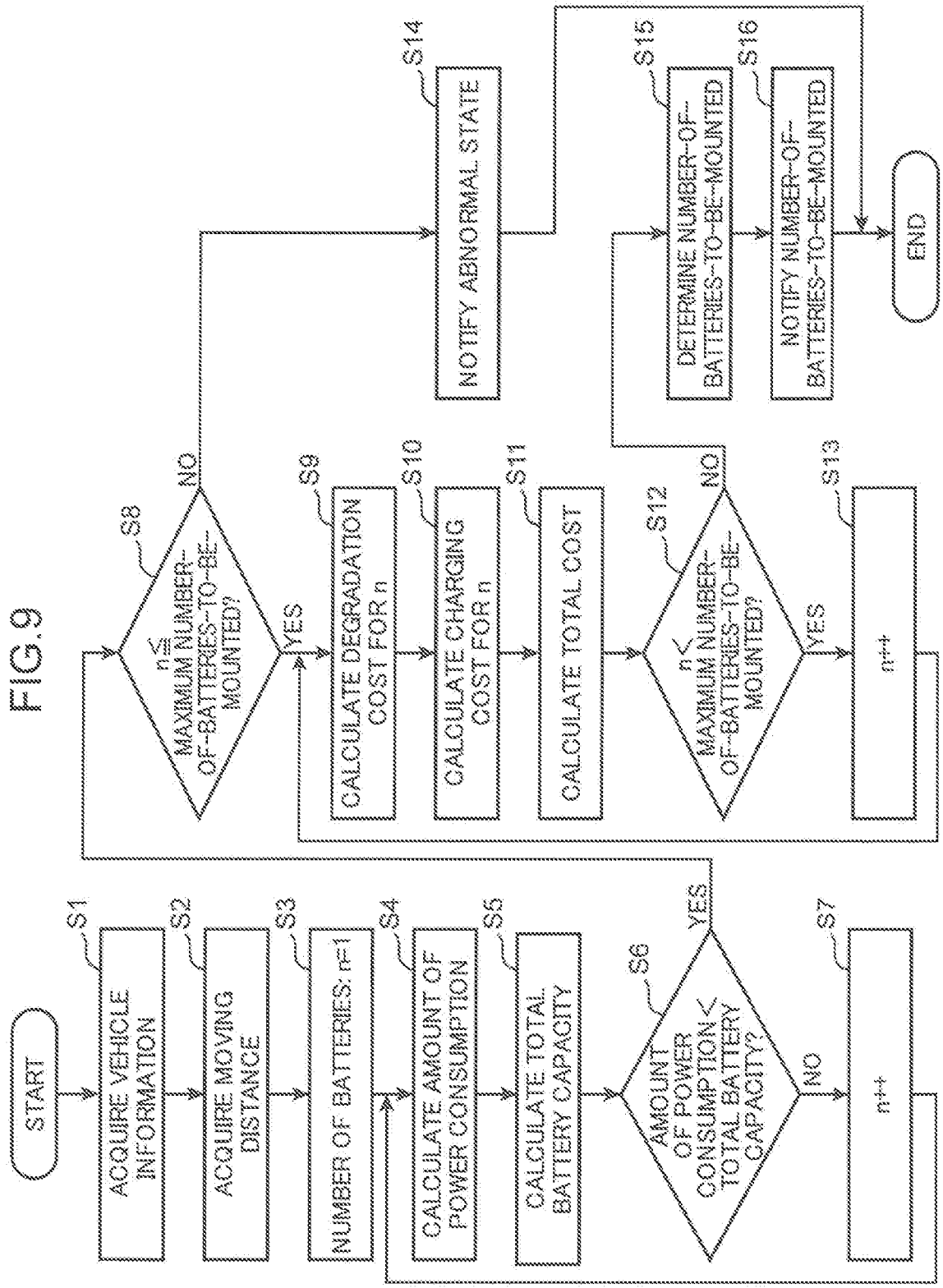
FIG. 9 is a flowchart showing an example of a process carried out by the terminal device according to the first embodiment.

Next, a process carried out by the terminal device 10 will be described. FIG. 9 is a flowchart showing an example of the process carried out by the terminal device 10 according to the first embodiment. This flowchart is applied to a case where the number-of-batteries-to-be-mounted of one mobile body 30 is calculated. Hereinafter, the mobile body 30 of this case will be referred to as a target mobile body.

In step S1, the vehicle information acquiring unit 111 acquires vehicle information on the target mobile body by communicating with the server 20. Thus, the weight, the maximum number-of-batteries-to-be-mounted, and the like of the target mobile body are acquired from the vehicle information table 231 of FIG. 6. When a load-carrying amount (kg) is input to an input screen 1001 shown in FIG. 10, the vehicle information acquiring unit 111 may acquire the input load-carrying amount as vehicle information. Further, when the worker inputs the weight of an occupant of the target mobile body, the vehicle information acquiring unit 111 may acquire the weight of a person as vehicle information.

In step S2, the moving distance acquiring unit 112 inputs information of a point of departure, a transit point, a destination, and the like, the information being entered by the worker, to a predetermined route search system, thereby acquiring the traveling route of the target mobile body and the moving distance of the traveling route.

In step S3, the power consumption amount calculation unit 113 sets the number-of-batteries n to n=1. In step S4, the power consumption amount calculation unit 113 calculates the total weight of the target mobile body from a total of the weight acquired in step S1 and the weight of the battery pack 34 corresponding to the number-of-batteries n, and calculates the amount of power consumption of the target mobile body, based on the calculated total weight and on the moving distance acquired in step S2. The amount of power consumption has been described in detail above and is therefore not described here. The total weight may be, for example, the total of the weight of the mobile body 30 and the weight of the battery pack 34 corresponding to the number-of-batteries n, or may be a value obtained by adding the load-carrying amount, the weight of the occupant, and the like to the total.

In step S5, the degradation cost calculation unit 114 calculates the total battery capacity corresponding to the number-of-batteries n. In this case, a mode of calculating the total battery capacity in consideration of the above-mentioned remaining capacity of each battery pack 34 may be adopted or a mode of calculating the total battery capacity in consideration of the above-mentioned start remaining capacity may be adopted.

In step S6, the degradation cost calculation unit 114 determines whether the amount of power consumption calculated in step S4 is smaller than the total battery capacity calculated in step S5. When determining that the amount of power consumption is equal to or larger than the total battery capacity (NO in step S6), the degradation cost calculation unit 114 increments the value of number-of-batteries n by 1 (step S7), and returns the process flow to step S4. In this case, in step S4, the power consumption amount calculation unit 113 calculates the total weight of the target mobile body in consideration of a total of the weights of the battery packs 34, the total corresponding to the value of the number-of-batteries n incremented by 1, and calculates the amount of power consumption, using the above-described method.

When it is determined in step S6 that the amount of power consumption is smaller than the total battery capacity (YES in step S6), the process flow proceeds to step S8. The number-of-batteries n at the point at which determination is made as YES in step S6 is equivalent to the above-mentioned minimum number-of-batteries n_min.

In step S8, the degradation cost calculation unit 114 determines whether the number-of-batteries n is equal to or smaller than the maximum number-of-batteries-to-be-mounted n_max of the target mobile body. When the number-of-batteries n is equal to or smaller than the maximum number-of-batteries-to-be-mounted n_max of the target mobile body (YES in step S8), the degradation cost calculation unit 114 calculates a degradation cost corresponding to the number-of-batteries n (step S9). In this case, the degradation cost calculation unit 114 calculates the degradation cost in such a manner that the degradation cost calculation unit 114 refers to the degradation cost calculation information 601A shown in FIG. 3 and identifies the degradation cost corresponding to the number-of-batteries n.

In step S10, the charging cost calculation unit 115 calculates a charging cost corresponding to the number-of-batteries n. In this case, the charging cost calculation unit 115 calculates the charging cost in such a manner that the charging cost calculation unit 115 refers to the charging cost calculation information 602 shown in FIG. 3 and identifies the charging cost corresponding to the number-of-batteries n.

In step S11, the number-of-batteries determination unit 116 adds up the degradation cost calculated in step S9 and the charging cost calculated in step S10, thereby calculating a total cost corresponding to the number-of-batteries n.

In step S12, the number-of-batteries determination unit 116 determines whether the number-of-batteries n is smaller than the maximum number-of-batteries-to-be-mounted n_max. When the number-of-batteries n is smaller than the maximum number-of-batteries-to-be-mounted n_max (YES in step S12), the value of the number-of-batteries n can be incremented. The number-of-batteries determination unit 116 thus increments the value of the number-of-batteries n by 1 (step S13), and returns the process flow to step S9. By repeating a loop of step S9 to step S13, a total cost for each number-of-batteries n is calculated in a range from the minimum number-of-batteries n_min to the maximum number-of-batteries-to-be-mounted n_max.

When it is determined in step S8 that the number-of-batteries n is larger than the maximum number-of-batteries-to-be-mounted n_max (NO in step S8), the number-of-batteries determination unit 116 notifies the worker of an abnormal state (step S14). The abnormal state is notified because even if the battery packs 34 having the maximum number-of-batteries-to-be-mounted n_max are mounted on the target mobile body, power covering the amount of power consumption cannot be provided. Modes of notification include, for example, displaying a message indicating the abnormal state on the display unit 15 or outputting a voice message from the speaker (not shown). In this notification, a message may be output, which indicates that even if the battery packs 34 having the maximum number-of-batteries-to-be-mounted n_max are mounted on the target mobile body, power covering the amount of power consumption cannot be provided. Completing the process of step S14 puts the whole process shown FIG. 9 to an end.

When it is determined in step S12 that the number-of-batteries n is equal to or larger than the maximum number-of-batteries-to-be-mounted n_max (NO in step S12), the number-of-batteries determination unit 116 identifies a number-of-batteries n that minimizes a total cost among total costs calculated respectively for numbers-of-batteries n, and determines the number-of-batteries n to be the number-of-batteries-to-be-mounted (step S15).

In step S16, the number-of-batteries determination unit 116 notifies the worker of the number-of-batteries-to-be-mounted. In this case, the number-of-batteries determination unit 116 outputs a message indicating the number-of-batteries-to-be-mounted on the display unit 15 or outputs a voice message indicating the number-of-batteries-to-be-mounted from the speaker (not illustrated). Then, the whole process shown in FIG. 9 comes to an end.

Figure 10:
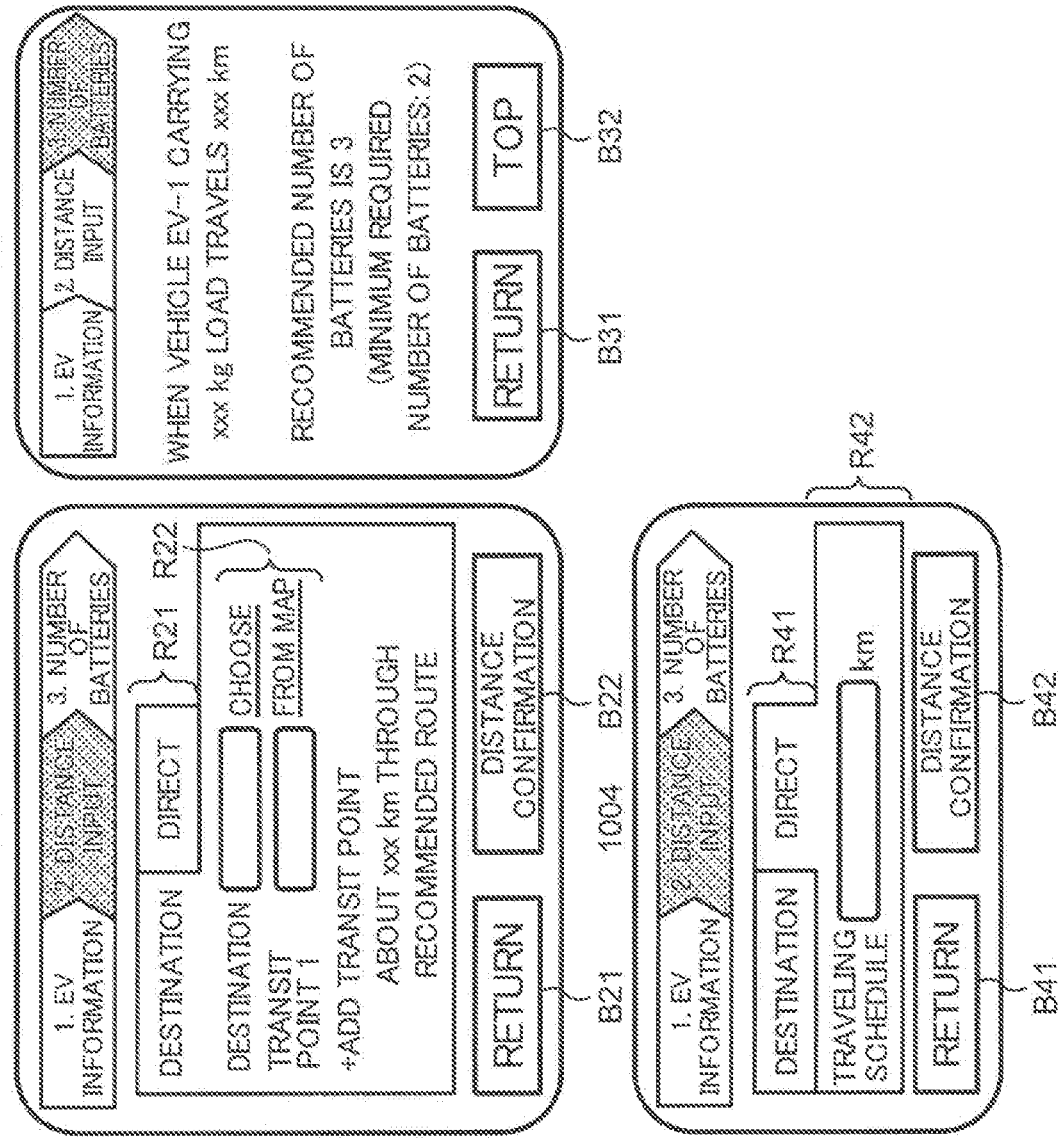
FIG. 10 illustrates an example of input screens displayed on the terminal device, according to the first embodiment.

FIG. 10 illustrates an example of input screens 1001, 1002, 1003, and 1004 displayed on the terminal device 10 according to the first embodiment. The input screen 1001 is an input screen for selecting a target mobile body, and is displayed on the display unit 15 of the terminal device 10 by the vehicle information acquiring unit 111, for example, in step S1 of FIG. 9. The input screen 1001 includes a vehicle input field R1, a load-carrying amount input field R2, and a vehicle information confirmation button B1. The vehicle input field R1 is a field for inputting identification information on the target mobile body. In this vehicle input field R1, mobile body IDs, such as "EV-1" and "EV-2", for mobile bodies 30 managed at a delivery base having the terminal device 10 placed therein are listed. The worker carries out an operation of selecting any mobile body ID from the mobile body IDs listed in the vehicle input field R1, thereby selecting the target mobile body.

The vehicle input field R1 includes a "new registration" field. When the "new registration" field is selected by the worker, a screen (not illustrated) for inputting a mobile body ID is displayed. The worker can register a new mobile body 30 on this screen. Thereafter, a list of mobile body IDs for registered mobile bodies 30 are displayed in the vehicle input field R1.

The load-carrying amount input field R2 is a field for inputting the weight of a load put onto the mobile body 30 selected at the vehicle input field R1. For example, the worker inputs the total weight of the load delivered by the mobile body 30, to the load-carrying amount input field R2. It should be noted that data input to the load-carrying amount input field R2 is not mandatory but is optional. The vehicle information confirmation button B1 is a button that is selected by the worker when input to the vehicle input field R1 and to the load-carrying amount input field R2 is over. When an operation of selecting the vehicle information confirmation button B1 is carried out, the input screen 1002 is displayed on the display unit 15.

The input screen 1002 is a screen for indirectly inputting the moving distance of the target mobile body, and is displayed on the display unit 15 of the terminal device 10 by the moving distance acquiring unit 112, for example, in step S2 of FIG. 9.

The input screen 1002 includes a tab field R21, a destination input field R22, a return button B21, and a distance confirmation button B22. In the tab field R21, a tab for switching between display of the input screen 1002 and display of the input screen 1004 is displayed. When the worker carries out an operation of selecting a "destination" tab in the tab field R21, the moving distance acquiring unit 112 displays the input screen 1002 on the display unit 15. On the other hand, when the worker carries out an operation of selecting a "direct" tab in the tab field R21, the moving distance acquiring unit 112 displays the input screen 1004 on the display unit 15.

The destination input field R22 is a field for inputting a destination and a transit point of the target mobile body. This destination input field R22 includes a field for inputting the destination of the target mobile body and a field for inputting the transit point of the same. The worker inputs the destination of the target mobile body to the field for inputting the destination and inputs the transit point of the target mobile body to the field for inputting the transit point. The worker may input position information (e.g., an address or latitude and longitude) directly to the field for inputting the destination and the field for inputting the transit point, or may input position information on the destination and transit point by specifying the positions of the destination and transit point on a map screen. In this case, the worker carries out an operation of selecting a "choose from map" field. This causes the map screen to be displayed on the display unit 15, and the worker carries out an operation of specifying the destination and transit point on the map screen, thus being able to input position information on the destination and transit point.

The destination input field R22 further includes a "+ add transit point" field. When the worker carries out an operation of selecting the "+ add transit point" field, an input field (not illustrated) for inputting an additional transit point is displayed in the destination input field R22. The worker can input position information on the transit point to this input field. It should be noted that in a case where the target mobile body leaves the delivery base and travels through a traveling route of returning to the delivery base via one or more delivery destinations, the destination is, for example, the delivery base while the transit point is each delivery destination.

When the worker's input to the destination input field R22 ends, the moving distance acquiring unit 112 enters the inputted destination and transit point in a known route search system, thereby calculating the traveling route and the moving distance of the target mobile body. The calculated moving distance is displayed in a field with a note "about xxx km through recommended route", the field being under the destination input field R22.

The distance confirmation button B22 is a button that is selected by the worker when the moving distance of the target mobile body is confirmed. When an operation of selecting the distance confirmation button B22 is carried out, the input screen 1003 is displayed on the display unit 15. The return button B21 is a button for switching the input screen 1002 back to the input screen 1001.

The input screen 1004 is a screen for directly inputting the moving distance of the target mobile body. The input screen 1004 includes a tab field R41, a distance input field R42, a return button B41, and a distance confirmation button B42. The tab field R41 is the same as the tab field R21. The distance input field R42 is a field to which the worker directly inputs the moving distance of the target mobile body. The worker inputs the moving distance of an optimum route, the moving distance being acquired from, for example, an external route search system or the like, to the distance input field R42. The return button B41 is the same as the return button B21. The distance confirmation button B42 is the same as the distance confirmation button B22.

The input screen 1003 is an input screen for notifying the worker of the number-of-batteries-to-be-mounted finally determined by the process flow of FIG. 9, and is displayed, for example, in step S16 of FIG. 9.

In this example, "3" is displayed as the number-of-batteries-to-be-mounted for a case where the mobile body 30 whose mobile body ID is "EV-1", the mobile body 30 being the target mobile body, carries a load of xxx kg of and travels a distance of xxx km. Under the number-of-batteries-to-be-mounted being displayed, a smallest number of batteries is displayed as 2. This smallest number of batteries is the minimum number-of-batteries n_min that provides power covering the amount of power consumption.

The return button B31 is a button for switching the input screen 1003 back to the input screen 1002 or the input screen 1004. The TOP button B32 is a button for switching the input screen 1003 back to the input screen 1001.

As described above, according to this embodiment, the number-of-batteries-to-be-mounted is determined by taking into consideration the charging cost in addition to the degradation cost. Because of this, the number of batteries can be determined so as to reduce the total cost of the battery pack 34.

Second Embodiment

In a second embodiment, a server 20 A is mainly responsible for determining the number-of-batteries-to-be-mounted. In this embodiment, the same constituent elements as described in the first embodiment are denoted by the same reference signs and are omitted in further description.

Figure 11:
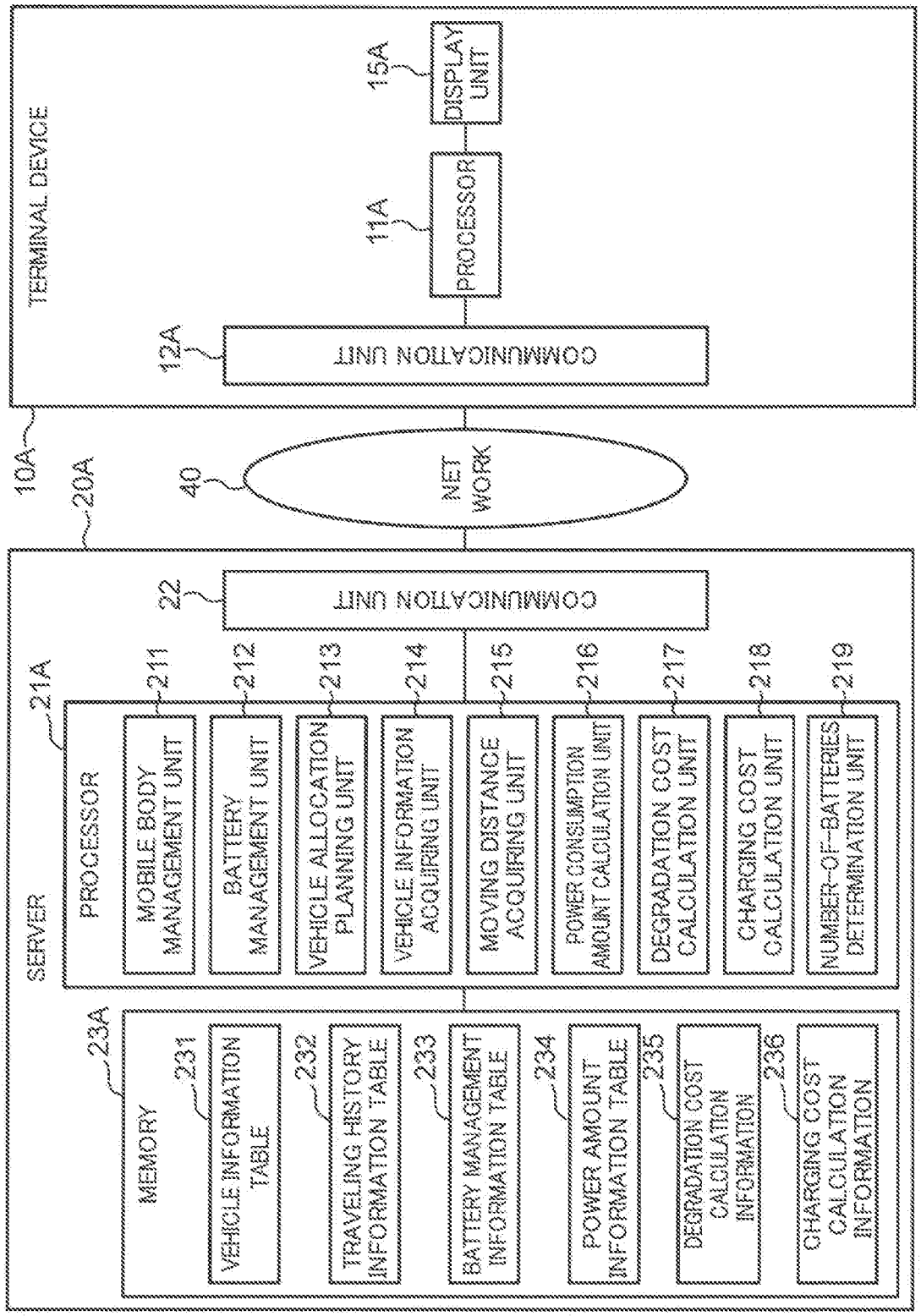
FIG. 11 is a block diagram showing an example of detailed configurations of a server and a terminal device according to a second embodiment.

FIG. 11 is a block diagram showing an example of detailed configurations of the server 20A and a terminal device 10A according to the second embodiment. An overall configuration of the information processing system 1 according to this embodiment is the same as the configuration shown in FIG. 1 and is therefore not described further.

The server 20A includes a processor 21A, the communication unit 22, and a memory 23A. The processor 21A includes the mobile body management unit 211 and the battery management unit 212, which are described with reference to FIG. 5, and further includes a vehicle allocation planning unit 213, a vehicle information acquiring unit 214, a moving distance acquiring unit 215, a power consumption amount calculation unit 216, a degradation cost calculation unit 217, a charging cost calculation unit 218, and a number-of-batteries determination unit 219.

The memory 23A stores the vehicle information table 231, the traveling history information table 232, and the battery management information table 233, which are described with reference to FIG. 5, and further stores a power amount information table 234, degradation cost calculation information 235, and charging cost calculation information 236.

The mobile body management unit 211 creates the power amount information table 234, based on traveling history information stored in the traveling history information table 232.

FIG. 12 illustrates an example of a data configuration of the power amount information table 234. The power amount information table 234 is a table storing power amount information that associates each mobile body 30 with a moving distance range and an amount of power consumption for each number-of-batteries n.

The power amount information table 234 includes mobile body ID, number-of-batteries, load-carrying amount range, moving distance range, and amount of power consumption. The mobile body ID is the identifier for the mobile body 30. The number-of-batteries is the number of batteries mounted on the mobile body 30. The load-carrying amount range is a range of the amount of a load the mobile body 30 carries. As the load-carrying amount range, for example, a predetermined amount range set in advance is adopted. The load-carrying amount range may be classified into ranges of predetermined amounts (e.g., 100 kg, 150 kg, 200 kg, etc.), for example, more than 0 kg and less than L1 kg, L1 kg or more and less than L2 kg, and L2 kg or more and less than L3 kg. The load-carrying amount range may also be expressed as, for example, light weight (e.g., more than 0 kg and less than 100 kg), medium weight (e.g., 100 kg or more and less than 200 kg), and heavy weight (e.g., 200 kg or more). The moving distance range is a range of the moving distance of the mobile body 30. As the moving distance range, for example, a predetermined distance range set in advance is adopted. The moving distance range may be classified into ranges of predetermined distances (e.g., 1 km, 5 km, 10 km, etc.), for example, more than 0 km and less than A1 km, A1 km or more and less than A2 km, and A2 km or more and less than A3 km. The moving distance range may also be expressed as, for example, short distance (e.g., more than 0 km and less than 5 km), medium distance (e.g., 5 km or more and less than 20 km), and long distance (e.g., 20 km or more). The amount of power consumption is an average of the amount of power consumption representing the amount of power consumed by the mobile body 30 when it travels within the corresponding moving distance range, the mobile body 30 carrying the battery packs 34 the number of which is the corresponding number of batteries.

The mobile body management unit 211 classifies traveling history information stored in the traveling history information table 232 shown in FIG. 7 for each of combinations of the mobile body ID, the number-of-batteries-to-be-mounted, the load-carrying amount range, and the moving distance range. The mobile body management unit 211 calculates an average of the amount of power consumption for each classified combination. As a result, for each mobile body 30, an average of the amount of power consumption for each combination of the number-of-batteries, the load-carrying amount, and the moving distance range can be obtained. The mobile body management unit 211 writes the calculated average of the amount of power consumption to the corresponding field of amount of power consumption in the power amount information table 234.

The above process is carried out for each mobile body 30 to create the power amount information table 234. The moving distance and the amount of power consumption that are stored in the power amount information table 234 may be updated every time traveling history information on the corresponding mobile body 30 is added to the traveling history information table 232, or may be updated every time a certain number of pieces of traveling history information on the corresponding mobile body 30 is added to the traveling history information table 232. The amount of power consumption in the power amount information table 234 may be calculated by using a machine learning model that is trained by a machine learning process using the number-of-batteries-to-be-mounted, the load-carrying amount, and the moving distance extracted from the traveling history information, as training data and the amount of power consumption extracted from the same, as reference data. In this case, the machine learning model is trained for each mobile body, each mobile body type, or a group of mobile bodies similar in attributes. The machine learning model may be trained for each battery type. In such a case, information of the type of batteries to be mounted is added to the traveling history information.

A process carried out by the battery management unit 212 is the same as that carried out by the battery management unit 212 shown in FIG. 5, and is therefore not described in detail here.

The vehicle allocation planning unit 213 creates a vehicle allocation plan for each of the mobile bodies 30 under management by the server 20A. A vehicle allocation plan is, for example, information defining a load to be delivered by each mobile body 30 and a delivery time zone (e.g., in the morning, in the afternoon, or the like). The vehicle allocation plan also includes the total weight of a load to be delivered by each mobile body 30.

The vehicle allocation planning unit 213, for example, based on information of delivery destinations of all loads, allocates loads to be handled to each delivery base and also allocates loads to be delivered to mobile bodies 30 at each delivery base. In this case, the vehicle allocation planning unit 213 creates a vehicle allocation plan in consideration of, for example, the load-carrying capacity of each mobile body 30 and a requested delivery time of each load so that burden on each mobile body 30 is made equal.

The vehicle information acquiring unit 214 acquires vehicle information on the mobile body 30 from the vehicle information table 231 stored in the memory 23A, similarly to the vehicle information acquiring unit 111 shown in FIG. 2.

The moving distance acquiring unit 215 calculates an optimum traveling route for each mobile body 30 and the moving distance on the traveling route, according to the vehicle allocation plan for each mobile body 30, the vehicle allocation plan being created by the vehicle allocation planning unit 213. In this case, the moving distance acquiring unit 215 acquires the traveling route and the moving distance of each mobile body 30 by inputting a delivery destination, a delivery time, and the like indicated by the vehicle allocation plan for each mobile body 30, to the route search system.

The power consumption amount calculation unit 216 calculates the amount of power consumption of each mobile body 30 similarly to the power consumption amount calculation unit 113 shown in FIG. 2. According to this embodiment, however, when a predetermined number or more of pieces of traveling history information are accumulated in the traveling history information table 232 and the information contents of the power amount information table 234 is calculated based on the accumulated traveling history information, the power consumption amount calculation unit 216 may calculate power amount information using the power amount information table 234. Calculation of the amount of power consumption using the power amount information table 234 will be described later.

Processes carried out by the degradation cost calculation unit 217, the charging cost calculation unit 218, and the number-of-batteries determination unit 219 are the same as processes carried out by of the degradation cost calculation unit 114, the charging cost calculation unit 115, and the number-of-batteries determination unit 116 shown in FIG. 2, and are therefore not described in detail here.

The degradation cost calculation information 235 and the charging cost calculation information 236 are the same as the degradation cost calculation information 601 and the charging cost calculation information 602 shown in FIG. 2, respectively, and are therefore not described here.

The terminal device 10A includes a processor 11A, a communication unit 12A, and a display unit 15A. Because the server 20A is the principal processing unit mainly responsible for processing in the second embodiment, the processor 11A does not include the functional blocks included in the processor 11 of the first embodiment, and these functional blocks are included in the processor 21A of the server 20A.

The processor 11A is, for example, an electric circuit, such as a CPU, and performs overall control over the terminal device 10A. The processor 11A acquires information indicating the number-of-batteries-to-be-mounted of each of one or more mobile bodies 30 managed by the terminal device 10A, from the server 20 via the communication unit 12A. The communication unit 12A is, for example, a communication circuit that connects the terminal device 10A to the network 40, and receives information indicating the number-of-batteries-to-be-mounted that is transmitted from the server 20A. Under control by the processor 11A, the display unit 15A displays information indicating the number-of-batteries-to-be-mounted of each mobile body 30.

Next, an operation of the information processing system 1 according to the second embodiment will be described with reference to a flowchart of FIG. 9. In the second embodiment, the process flow shown in FIG. 9 starts, for example, when the vehicle allocation planning unit 213 creates a vehicle allocation plan. The vehicle allocation plan is executed, for example, once a day at a predetermined time in accordance with business days of each delivery base.

The processes of steps S1 to S13 are executed by the processor 11 in the first embodiment. In the second embodiment, however, the processes are executed by the processor 21A of the server 20A, which makes the second embodiment difference from the first embodiment. The details of the processes of steps S1 to S13 and S15 are the same as those of the first embodiment, except that the principle processing unit is the server 20A.

According to the second embodiment, however, in step S4, the power consumption amount calculation unit 216 refers to the power amount information table 234 and calculates the amount of power consumption of the mobile body 30 through the following process. The power consumption amount calculation unit 216 determines the amount of power consumption corresponding to the mobile body ID of the mobile body 30 that is the target mobile body, the moving distance of the mobile body 30 that is acquired in step S2, and the number-of-batteries n set in step S3 or step S7, from the power amount information table 234. Specifically, the power consumption amount calculation unit 216 extracts records containing the mobile body ID and the number-of-batteries n of the mobile body 30, from the power amount information table 234. Out of the extracted records, the power consumption amount calculation unit 216 extracts a record containing a moving distance range to which the moving distance acquired in step S2 belongs. The power consumption amount calculation unit 216 thus determines an amount of the power consumption included in the extracted record to be the amount of power consumption of the mobile body 30.

When the amount of power consumption corresponding to mobile body 30 is not stored in the power amount information table 234, the power consumption amount calculation unit 216 calculates the amount of power consumption using the method of calculating the amount of power consumption that is carried out by the power consumption amount calculation unit 113, the method being described in the first embodiment.

In step S14 of the second embodiment, the number-of-batteries determination unit 219 of the server 20A transmits a message indicating an abnormal state to the terminal device 10A via the communication unit 22, and the terminal device 10A having received the message displays the message on the display unit 15A. This notifies the worker of the abnormal state. In this case, the terminal device 10A may output a voice message indicating the abnormal state, from a speaker (not illustrated).

In step S16 of the second embodiment, the number-of-batteries determination unit 219 of the server 20A transmits a message indicating the number-of-batteries-to-be-mounted, to the terminal device 10A via the communication unit 22, and the terminal device 10A having received the message displays the message on the display unit 15A. This notifies the worker of the number-of-batteries-to-be-mounted of the mobile body 30. A voice message indicating the number-of-batteries-to-be-mounted may be output from the speaker (not illustrated).

In the second embodiment, when the number-of-batteries determination unit 219 has calculated numbers-of-batteries-to-be-mounted of all mobile bodies 30 managed by a certain delivery base, the number-of-batteries determination unit 219 may cause the terminal device 10A to display a message indicating the number-of-batteries-to-be-mounted of each mobile body 30.

FIG. 13 illustrates an example of the message screen 1300 according to the second embodiment. The message screen 1300 displays a list of numbers-of-batteries-to-be-mounted of mobile bodies 30 managed by a certain delivery base. Specifically, the message screen 1300 includes vehicle ID, loading amount, delivery route (moving distance), and number-of-batteries-to-be-mounted. In the vehicle ID field, a mobile body ID for each mobile body 30 is displayed. In the loading amount field, the total weight of loads carried by each mobile body 30 is displayed. This total weight is the total weight of loads of each mobile body 30 that is calculated by the vehicle allocation planning unit 213. The delivery route (moving distance) field displays a delivery route for each mobile body 30 and the moving distance of the delivery route. When an operation of selecting the delivery route display field is carried out, the terminal device 10A may cause the display unit 15A to display a map screen that shows the delivery route overlapping a map image. In the number-of-batteries-to-be-mounted field, the number-of-batteries-to-be-mounted of each mobile body 30 is displayed.

In this manner, because the number-of-batteries-to-be-mounted of each mobile body 30 is displayed on the message screen 1300, the worker can easily confirm the number of batteries to be mounted on each mobile body 30. In addition, the loading amount and the moving distance of each mobile body 30 are displayed on the message screen 1300. This notifies the worker of the validity of the number-of-batteries-to-be-mounted.

As described above, in the second embodiment, the server 20A works as the principal processing unit to determine the number-of-batteries-to-be-mounted. This reduces processing load on the terminal device 10A.

According to the present disclosure, the following modifications may be adopted.

(1) A plurality of pieces of degradation cost calculation information 601 shown in FIG. 3 may be provided in correspondence to numbers-of-batteries n. This is because the total weight of the mobile body 30 increases as the number-of-batteries n increases and the degradation cost decreases with the increase of the total weight. For example, in FIG. 3, the degradation cost calculation information 601B is associated with a number-of-batteries n larger than the number-of-batteries n with which the degradation cost calculation information 601 A is associated. The degradation cost calculation information 601B indicates that its degradation cost reduction rate is larger than that of the degradation cost calculation information 601A in an area where the value of the number-of-batteries n is small (e.g., n=1 to 2). In this manner, according to the modification (1), degradation cost calculation information 601 associated with a larger number-of-batteries n is characterized in that its degradation cost reduction rate in an area where the value of the number-of-batteries n is small is larger.

In this case, the degradation cost calculation unit 114 reads degradation cost calculation information 601 corresponding to a set number-of-batteries n, from the memory 14, and refers to the read degradation cost calculation information 601 to calculate a degradation cost.

It has been described above that a plurality of pieces of degradation cost calculation information 601 are provided in correspondence to numbers-of-batteries n. The plurality of pieces of degradation cost calculation information 601, however, may be provided in correspondence to sets of numbers-of-batteries n and load-carrying amounts of the mobile body 30. In this case, the plurality of pieces of degradation cost calculation information 601 are characterized in that, for example, the degradation cost reduction rate in the area where the number-of-batteries n is small increases as the increment of the weight of the mobile body 30 indicated by a set of the number-of-batteries n and the loading amount increases.

Furthermore, in this case, the degradation cost calculation unit 114 reads degradation cost calculation information 601 corresponding to a set number-of-batteries n and an actual loading amount of the mobile body 30, from the memory 14, and refers to the read degradation cost calculation information 601 to calculate a degradation cost.

(2) In the modification (1), it has been described that a plurality of pieces of degradation cost calculation information 601 are provided in correspondence to numbers-of-batteries n or to sets of numbers-of-batteries n and loading amounts. In the modification (2), one piece of degradation cost calculation information 601 may be stored in the memory 14, and the degradation cost calculation unit 114 may correct the degradation cost calculation information 601 stored in the memory, according to the number-of-batteries n or to a set of the number-of-batteries n and the loading amount.

In this case, the degradation cost calculation unit 114 corrects the degradation cost calculation information 601 such that the degradation cost reduction rate in the area where the value of the number-of-batteries n is small increases as the number-of-batteries n increases. Alternatively, the degradation cost calculation unit 114 corrects the degradation cost calculation information 601 such that the degradation cost reduction rate in the area where the value of the number-of-batteries n is small increases as the increment of the weight of the mobile body 30 indicated by a set of the number-of-batteries n and the loading amount increases.

(3) The degradation cost calculation unit 114 may calculate a degradation cost for each number-of-batteries n, based on a discharge current flowing through each battery pack 34. Because the battery packs 34 are connected in parallel, the discharge current flowing through each battery pack 34 decreases as the number-of-batteries n increases. As a result, the DOD of each battery pack 34 reduces, which suppresses an increase in degradation cost. Thus, according to the modification (3), information that sets in advance a correspondence relationship between the discharge current and the degradation cost is stored in the memory 14, as the degradation cost calculation information 601. The degradation cost calculation unit 114 calculates a discharge current flowing through each battery pack 34, according to the number-of-batteries n. The degradation cost calculation unit 114 then reads the degradation cost calculation information 601 that correlates the discharge current with the degradation cost, from the memory 14, and calculates the degradation cost corresponding to the calculated discharge current. In this case, as the degradation cost calculation information 601, for example, information is adopted in which a current flowing through each battery pack 34 is set, the information corresponding to the information of FIG. 3 showing the vertical axis representing the degradation cost and the horizontal axis representing the number-of-batteries n.

(4) In the first embodiment, the mobile body 30 may have various functions of the terminal device 10. In this case, these various functions may be provided in the vehicle control device 31 or the battery management device 32.

(5) In each embodiment, whether the determined number-of-batteries-to-be-mounted and the number of batteries actually mounted on the mobile body 30 is different may be determined and a notification reflecting the result of the determination may be output. For example, the terminal device 10 or the server 20 acquires the number of batteries mounted on the mobile body 30, from the battery management device 32 or the like, and determines whether the acquired number of batteries is different from the numberof-batteries-to-be-mounted. When determining that the acquired number of batteries is different from the number-of-batteries-to-be-mounted, the terminal device 10 or the server 20 outputs a notification recommending a change in the number of batteries. The outputted notification is displayed on the display unit 15 included in the terminal device 10 or on an external terminal, such as a smartphone. The notification may be presented in the form of a voice message from a smart speaker or the like, in place of or in addition to the displayed message.

(6) Each embodiment may be applied to a power storage device installed in a specific place, such as a home or an office.

Specifically, the information processing system acquires an amount of power consumption of a power storage device including one or more batteries, calculates a degradation cost of batteries for each of numbers of the one or more batteries, based on an amount of power consumption and on a number of batteries, calculates a use cost of a battery for each of the numbers of the one or more batteries, based on a number of batteries, determines a number of batteries to be mounted on the power storage device in accordance with the degradation cost and the use cost, and outputs the number of batteries to be amounted.

The amount of power consumption is a power consumption value per specific unit of time or unit of use. For example, the amount of power consumption may be a power consumption value per day or per use. The use cost is a cost required for mounting the battery. For example, the use cost may be a battery purchase cost, a rental cost, a maintenance cost, or the like.

When the number of batteries is large, the degradation cost decreases but the use cost increases. When the number of batteries is small, the degradation cost increases but the use cost decreases. Besides, the balance between the degradation cost and the use cost varies depending on the amount of power consumption. Based on this fact, as described above, the information processing system determines the number of batteries so as to reduce a total cost representing a total of the degradation cost and the use cost, based on the amount of power consumption.

In this manner, in this configuration, the number of batteries to be mounted is determined by taking into consideration the use cost and the degradation cost. Because of this, the number of batteries can be determined so as to reduce the total cost of the batteries, the total cost including the degradation cost of the batteries. In other words, the degradation of the batteries can be suppressed as the use cost of the batteries is suppressed. In addition, because the amount of power consumption is different for each user of the power storage device, the number of batteries required for a total cost suitable for each user can be determined.

INDUSTRIAL APPLICABILITY

The present disclosure allows determining a number of batteries that suppresses a total cost of batteries, and is therefore applied preferably to a mobile body of which the number of batteries can be changed.

The invention claimed is:

1. An information processing method executed by a computer, the method comprising:
(i) acquiring a total weight of an electric mobile body for a given number of batteries, the total weight including a weight of the given number of batteries to be used in the mobile body;
(ii) acquiring an amount of power consumption of the mobile body for the given number of batteries;
(iii) calculating a degradation cost for the given number of batteries, the degradation cost gradually decreasing as a number of batteries increases;
(iv) calculating a charging cost for the given number of the numbers of the one or more batteries, the charging cost being calculated based on the total weight, the charging cost being an estimated value representing a cost required for charging the electric mobile body and increasing gradually as the given number of the batteries increases;
(v) calculating a total cost for the given number of batteries in accordance with the degradation cost and the charging cost acquired for the given number of batteries;
repeating (i) to (v) by changing the given number of batteries by one from a minimum number of batteries up to a maximum number of batteries that the mobile body is able to mount, the minimum number of batteries being the smallest number of batteries of which a total battery capacity is able to cover the amount of power consumption; and
determining a number of batteries to be mounted on the mobile body as a number of batteries which minimizes the total cost, in accordance with the degradation cost and the charging cost such that a total cost, and outputting the number of batteries to be mounted,
wherein the method further comprises:
correcting a degradation cost calculation information stored in a memory, according to the number of batteries or to a set of the number of batteries and a loading amount, and
in (iii), the degradation cost is calculated by reading the degradation cost calculation information corresponding to the given number of batteries, from the memory, and referring to the read degradation cost calculation information.

2. The information processing method according to claim 1, further comprising acquiring a planned moving distance of the mobile body,
wherein in acquiring the amount of power consumption, the amount of power consumption is acquired by calculating the amount of power consumption for each of numbers of the one or more batteries, from the planned moving distance and the total weight.

3. The information processing method according to claim 1, further comprising acquiring a traveling history of the mobile body,
wherein in acquiring the amount of power consumption, the amount of power consumption corresponding to a planned moving distance of the mobile body is acquired for each of numbers of the one or more batteries, from the traveling history.

4. The information processing method according to claim 1, wherein in calculating the degradation cost, a remaining capacity of batteries is acquired for each of numbers of the one or more batteries, and the degradation cost is calculated based on a total of the remaining capacities for each of the numbers of the one or more batteries and on the amount of power consumption.

5. The information processing method according to claim 1, wherein in calculating the degradation cost, the degradation cost is calculated for each of numbers of the one or more batteries, based on a current flowing through each of one or more batteries.

6. The information processing method according to claim 1, wherein in determining the number of batteries to be mounted, the number of batteries to be mounted is determined according to a total of the degradation cost and the charging cost.

7. The information processing method according to claim 2, wherein in acquiring the planned moving distance, the planned moving distance is acquired based on user input.

8. The information processing method according to claim 2, wherein in acquiring the planned moving distance, a moving distance that is calculated based on a vehicle allocation plan to allocate the mobile body is acquired.

9. The information processing method according to claim 1, wherein the method further comprises:
  acquiring traveling history information of the mobile body, the traveling history information comprising a past moving distance, a number of batteries mounted for traveling the past moving distance, a load-carrying amount, for traveling the past moving distance and an amount of power consumption for traveling the past moving distance; and
  creating a power amount information table by using a machine learning model that is trained by a machine learning process using the number of batteries mounted for traveling the past moving distance, the load-carrying amount for traveling the past moving distance, and the past moving distance extracted from the traveling history information, as training data and the amount of power consumption extracted from the traveling history information, as reference data, and
  in (iii), the degradation cost is calculated by using the power amount information table and based on the given number of batteries.

10. The information processing method according to claim 1, further comprising:
  acquiring a number of the batteries actually mounted on the electric mobile body from a battery management device;
  determining whether the acquired number of batteries is different from the determined number of batteries;
  displaying a notification recommending a change in the number of batteries on a display device when determining that the acquired number of batteries is different from the determined number of batteries.

11. An information processing device comprising:
  a processor; and
  a non-transitory computer-readable medium storing an information processing program, the information processing program, when executed by the processor, causes the processor to perform:
  (i) acquiring a total weight of an electric mobile body for a given number of batteries, the total weight including a weight of the given number of batteries to be used in the mobile body;
  (ii) acquiring an amount of power consumption for the given number of batteries;
  (iii) acquiring a degradation cost of batteries for the given number of batteries, based on the amount of power consumption and on the given number of batteries, the degradation cost gradually decreasing as a number of batteries increases;
  (iv) calculating a charging cost for the given number of batteries, based on the total weight, the charging cost being an estimated value representing a cost required for charging the electric mobile body and increasing gradually as the given number of the batteries increases;
  (v) calculating a total cost for the given number of batteries in accordance with the degradation cost and the charging cost acquired for the given number of batteries;
  repeating (i) to (v) by changing the given number of batteries from a minimum number of batteries up to a maximum number of batteries that the mobile body is able to mount, the minimum number of batteries being the smallest number of batteries of which a total battery capacity is able to cover the amount of power consumption;
  determining a number of batteries to be mounted on the mobile body as a number of batteries which minimizes the total cost; and
  outputting the number of batteries to be mounted,
  wherein the processor further performs:
    correcting a degradation cost calculation information stored in a memory, according to the number of batteries or to a set of the number of batteries and a loading amount, and
    in (iii), the degradation cost is calculated by reading the degradation cost calculation information corresponding to the given number of batteries, from the memory, and referring to the read degradation cost calculation information.

12. A non-transitory computer-readable medium which stores an information processing program causing a computer to perform:
  (i) acquiring a total weight of an electric mobile body for a given number of batteries, the total weight including a weight of the given number of batteries to be used in the mobile body;
  (ii) acquiring an amount of power consumption for the given number of batteries;
  (iii) acquiring a degradation cost of batteries for the given number of batteries, based on the amount of power consumption and on the given number of batteries, the degradation cost gradually decreasing as a number of batteries increases;
  (iv) calculating a charging cost for the given number of batteries, based on the total weight, the charging cost being an estimated value representing a cost required for charging the electric mobile body and increasing gradually as the given number of the batteries increases;
  (v) calculating a total cost for the given number of batteries in accordance with the degradation cost and the charging cost acquired for the given number of batteries;
  repeating (i) to (v) by changing the given number of batteries by one from a minimum number of batteries up to a maximum number of batteries that the mobile body is able to mount, the minimum number of batteries being the smallest number of batteries of which a total battery capacity is able to cover the amount of power consumption;
  determining a number of batteries to be mounted on the mobile body as a number of batteries which minimizes the total cost; and
  outputting the number of batteries to be mounted,
  wherein the computer further performs:
    correcting a degradation cost calculation information stored in a memory, according to the number of batteries or to a set of the number of batteries and a loading amount, and
    in (iii), the degradation cost is calculated by reading the degradation cost calculation information corresponding to the given number of batteries, from the memory, and referring to the read degradation cost calculation information.

* * * * *